United States Patent

Ward

[11] Patent Number: 5,857,413
[45] Date of Patent: Jan. 12, 1999

[54] METHOD AND APPARATUS FOR AUTOMATED POWERED PALLET

[76] Inventor: Glen N. Ward, 12912 Madrona Leaf Ct., Grass Valley, Calif. 95945

[21] Appl. No.: 784,750

[22] Filed: Jan. 16, 1997

[51] Int. Cl.$^6$ .................................................. B61J 1/10
[52] U.S. Cl. ...................... 104/48; 104/130.01; 104/299; 104/300; 104/301; 104/88.03
[58] Field of Search .......................... 104/48, 50, 130.01, 104/295, 296, 299, 300, 301, 303, 88.93, 88.05

[56] References Cited

U.S. PATENT DOCUMENTS

| | | | |
|---|---|---|---|
| 989,759 | 4/1911 | Bradshaw . | |
| 2,469,575 | 5/1949 | Ralston et al. | 104/48 |
| 3,094,941 | 6/1963 | Hellner . | |
| 3,348,497 | 10/1967 | Mattsson . | |
| 3,356,039 | 12/1967 | Fondén et al. . | |
| 3,356,040 | 12/1967 | Fonden | 104/130.01 |
| 4,094,252 | 6/1978 | Pater et al. | 104/130.01 |
| 4,416,202 | 11/1983 | Rooklyn . | |
| 4,516,504 | 5/1985 | Brems et al. . | |
| 4,732,087 | 3/1988 | Morishita et al. | 104/303 |
| 4,922,830 | 5/1990 | Fujita et al. | 104/290 |
| 4,926,753 | 5/1990 | Weiss | 104/88.03 |
| 4,966,080 | 10/1990 | Tessier et al. | 104/289 |
| 5,044,283 | 9/1991 | Marie et al. . | |

Primary Examiner—S. Joseph Morano
Attorney, Agent, or Firm—Flehr Hohbach Test Albritton & Herbert LLP

[57] ABSTRACT

A powered pallet assembly (10) for use on two intersecting trackways (11 and 13). The pallet assembly (10) includes: a pallet frame (23) having an upwardly facing surface (12) formed for support of a load thereon; a first plurality of load-supporting wheels (16a, 16b) rotatably mounted to frame (23) for movement of pallet assembly (10) in a first direction on the first trackway (11); a second plurality of load-supporting wheels (18a, 18b) rotatably mounted to frame (23) for movement of pallet assembly (10) in a second direction intersecting the first direction on the second trackway (13) intersecting the first trackway (11); a power drive assembly carried by pallet frame (23) and coupled to drive at least one wheel of first wheels (16a, 16b) and coupled to drive at least one wheel of second wheels (18a, 18b). The first wheels (16a, 16b) are mounted to the frame (23) in a manner which causes them to be disengaged from a second trackway (13) when the pallet (10) is supported for movement on the second trackway (13) by second wheels (18a, 18b), and the second wheels (18a, 18b) are mounted to the frame (23) in a manner which causes them to be disengaged from the first trackway (11) when pallet (10) is supported on the first trackway (11) by the first wheels (16a, 16b). A method of operating the trackway-based pallet assembly also is disclosed.

70 Claims, 12 Drawing Sheets

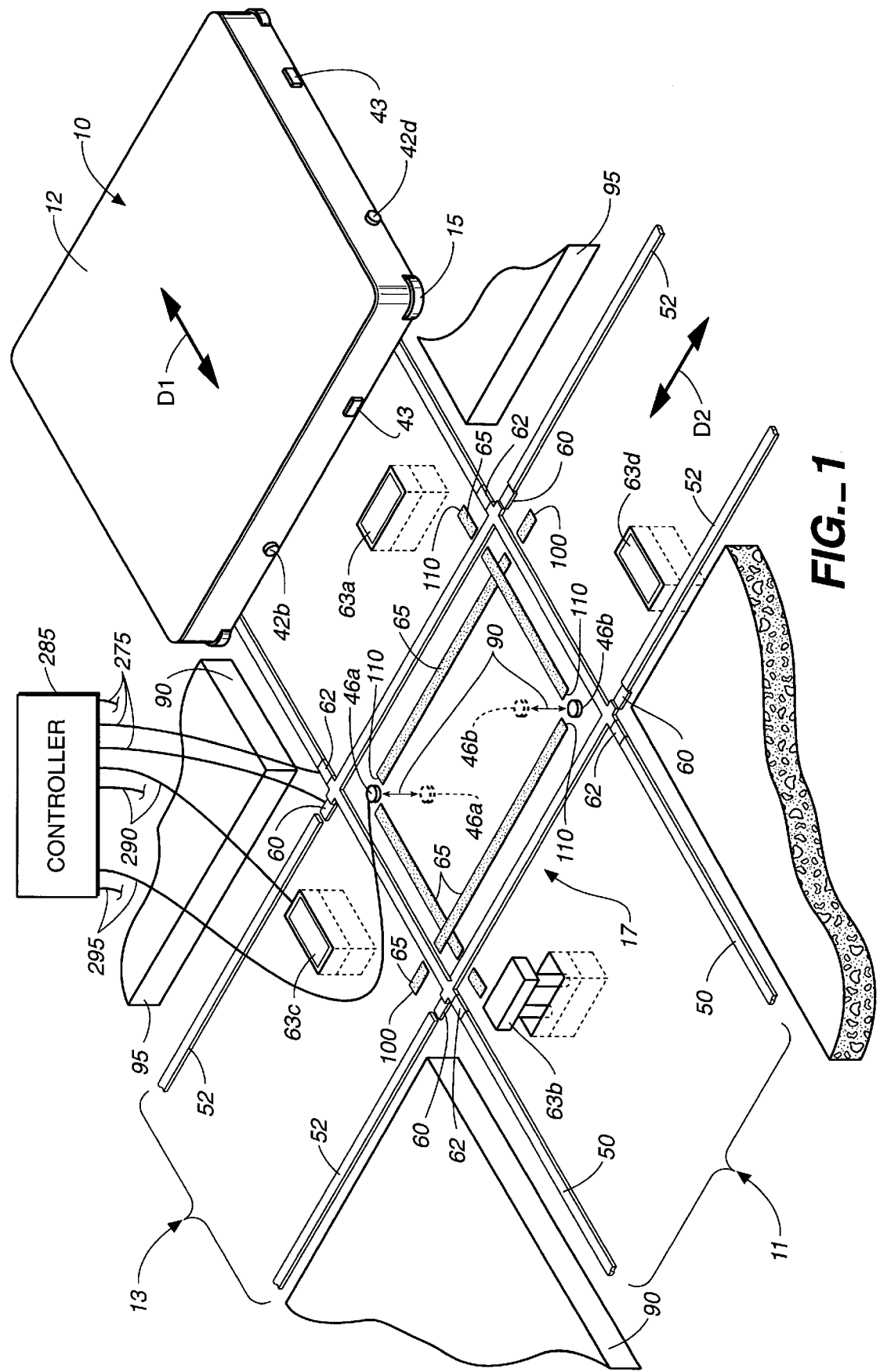
FIG._1

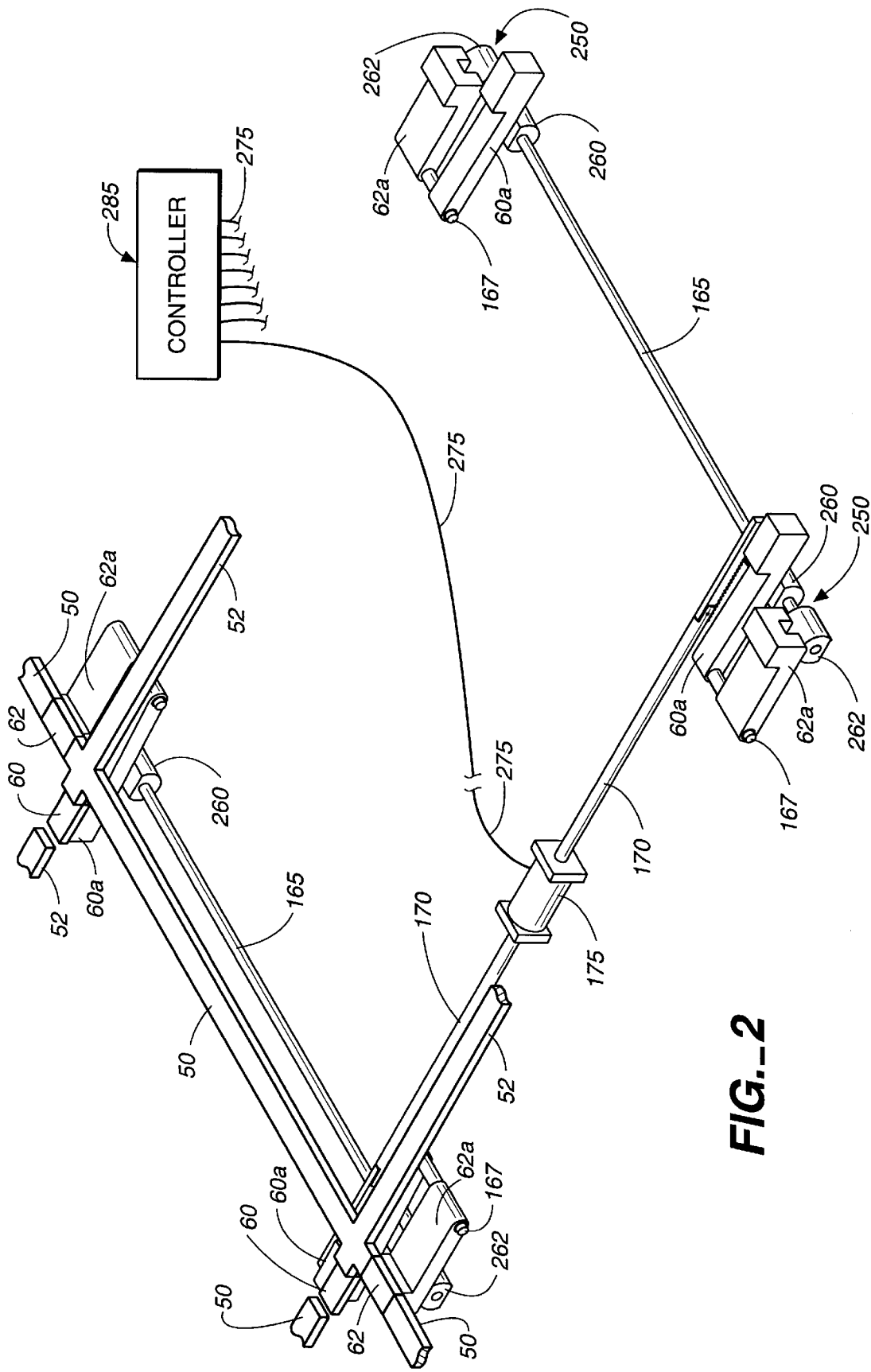
FIG._2

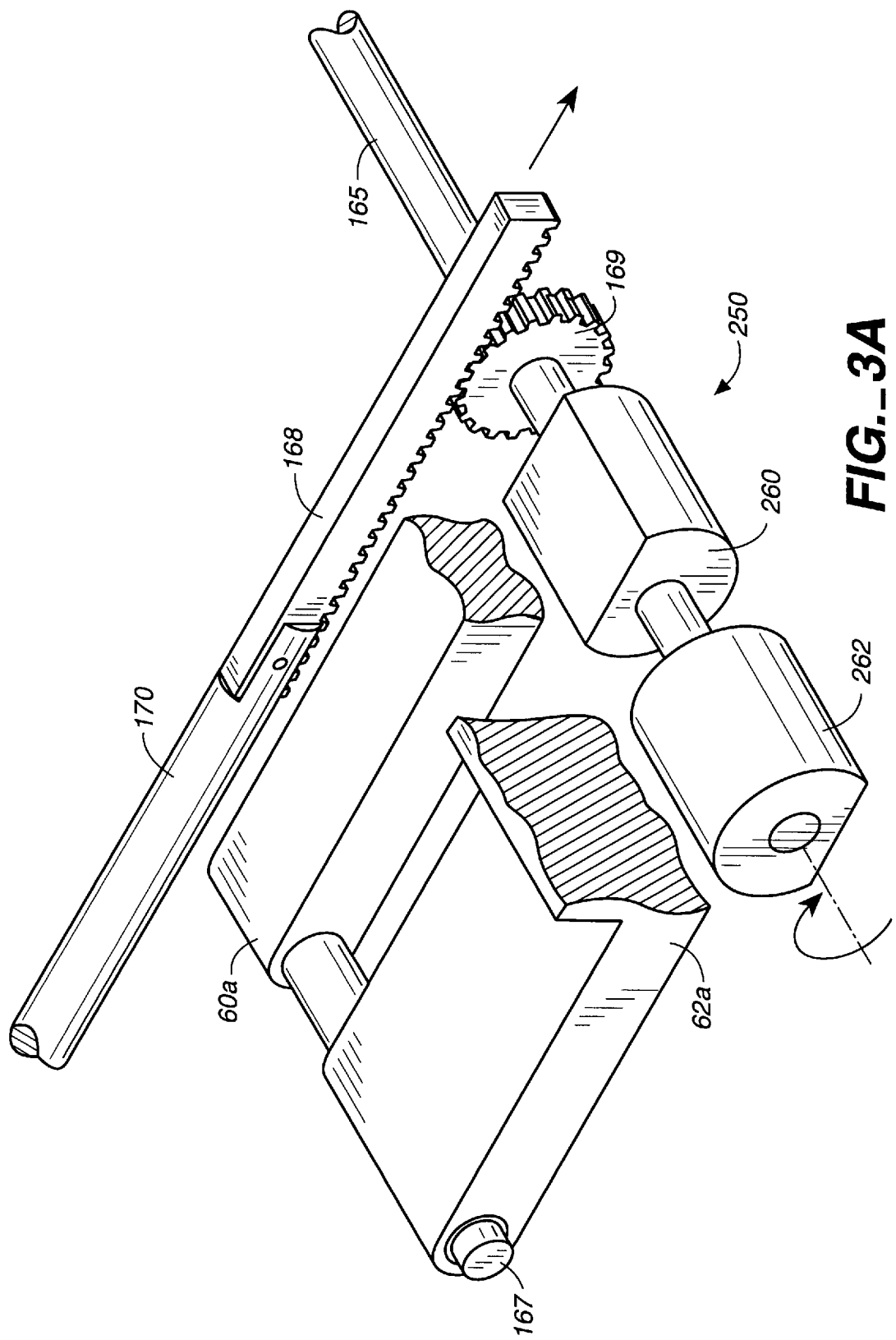

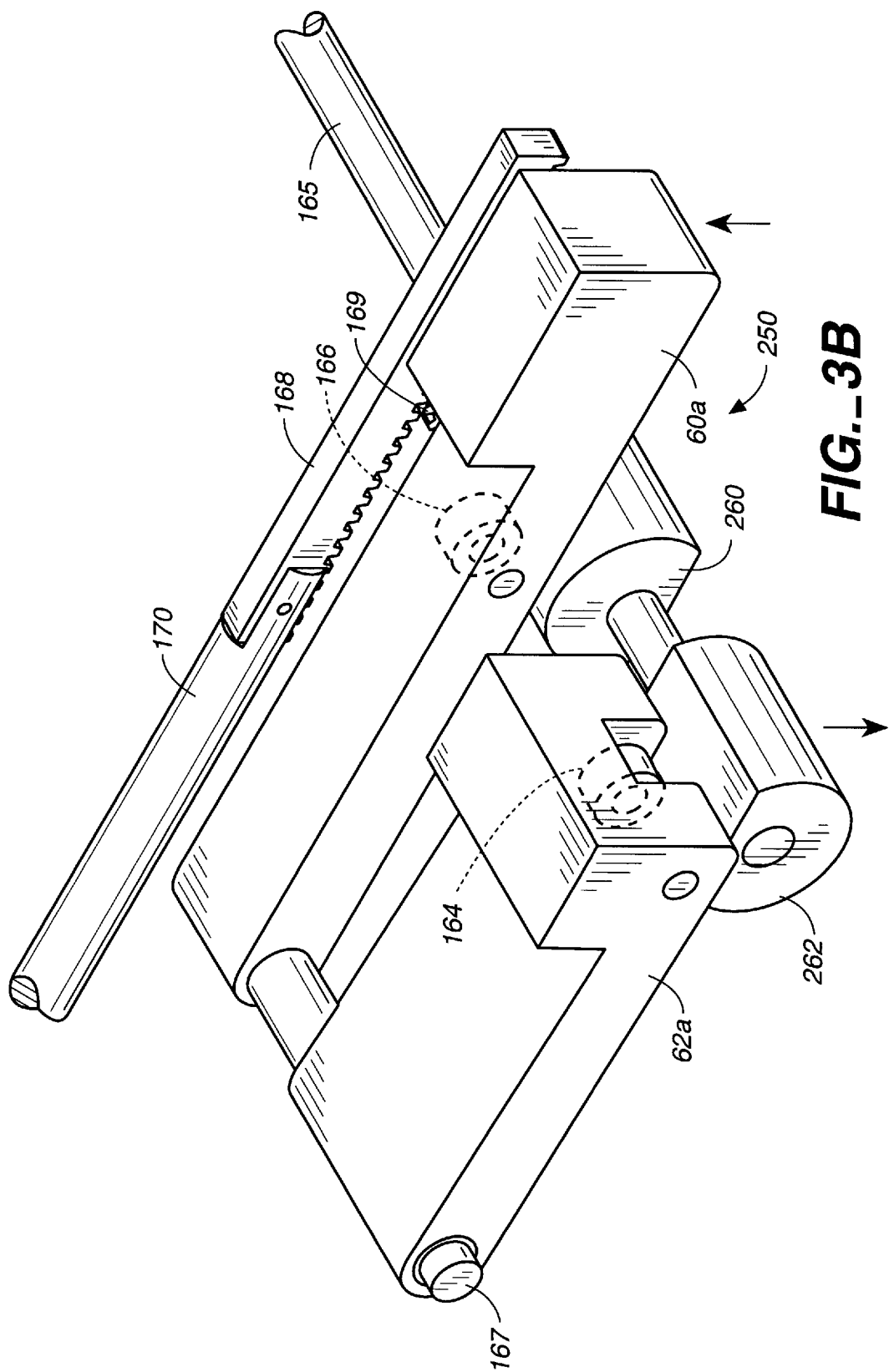
FIG._3B

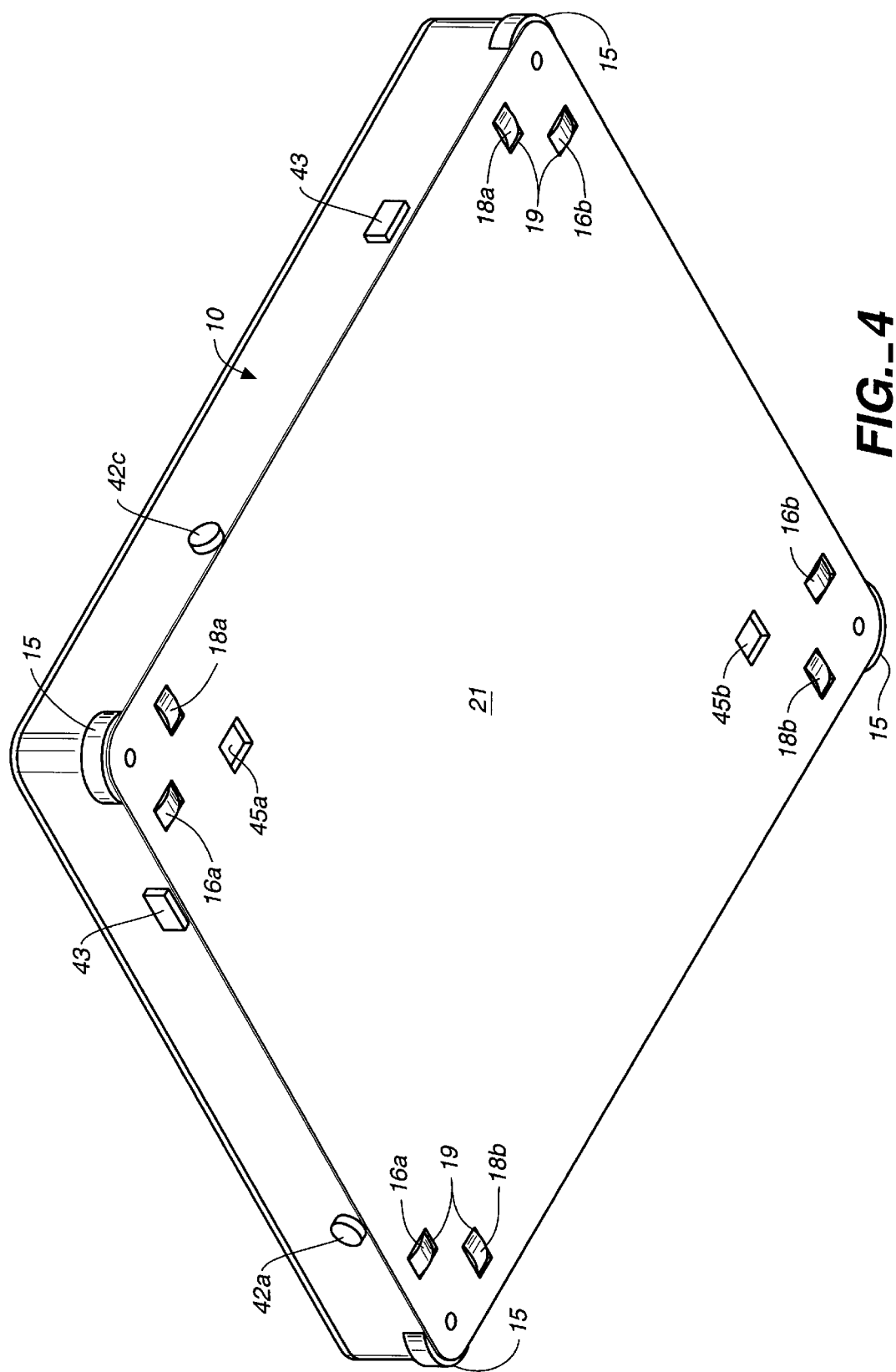

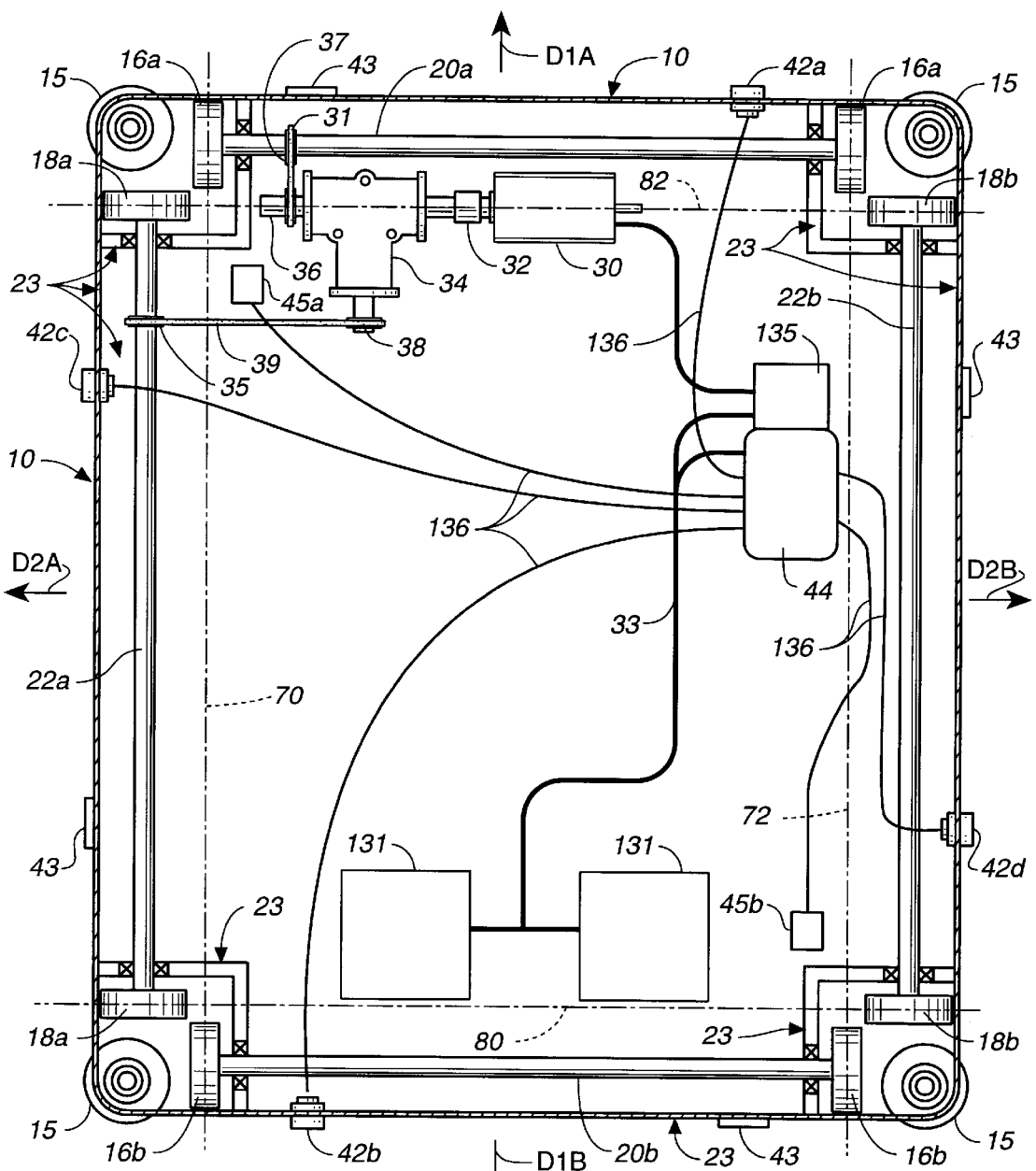
FIG._5

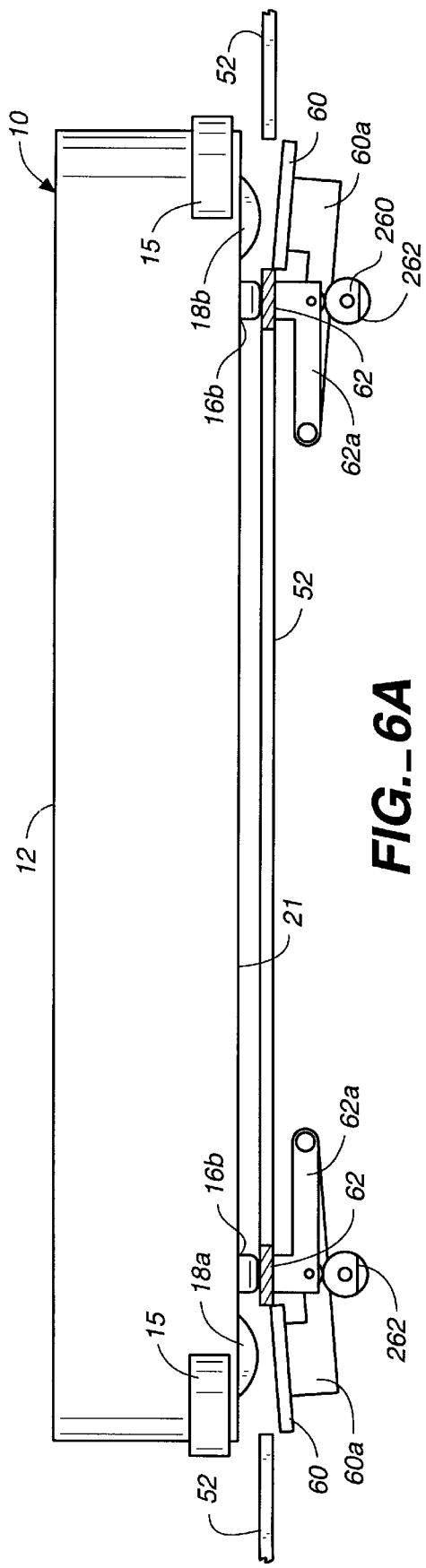
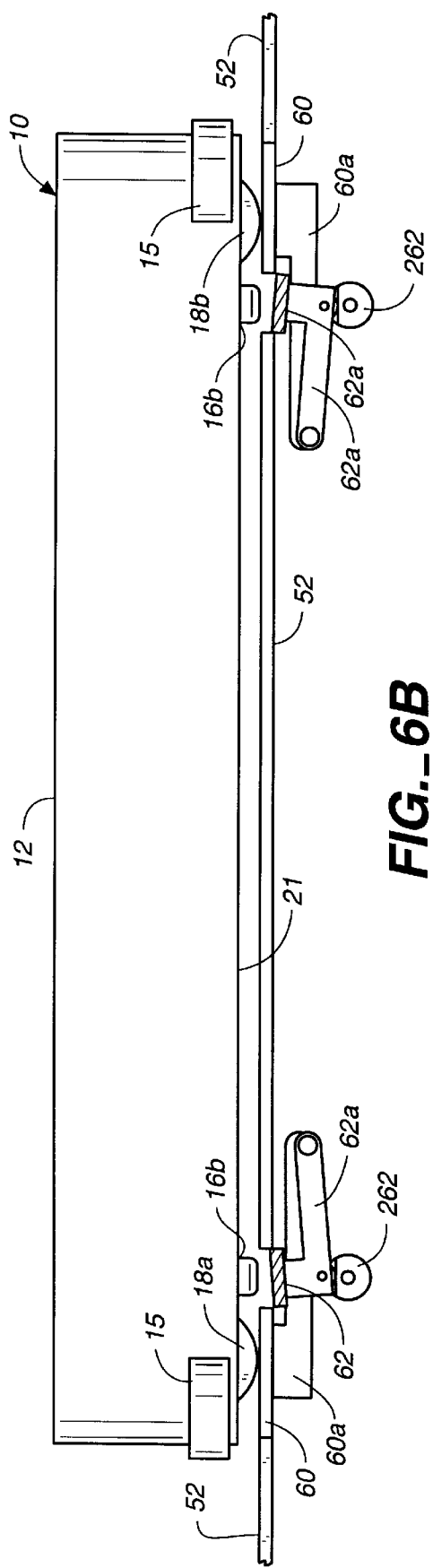

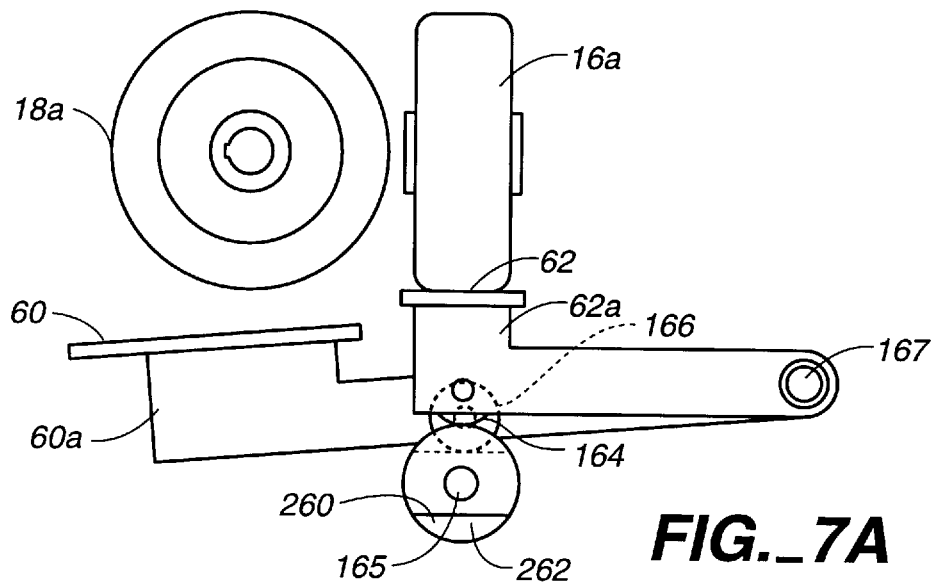
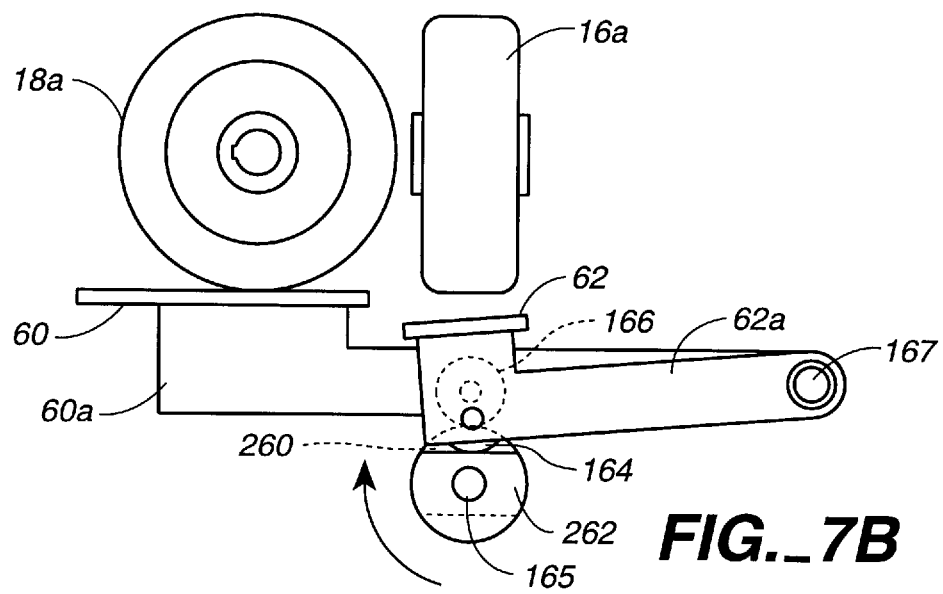

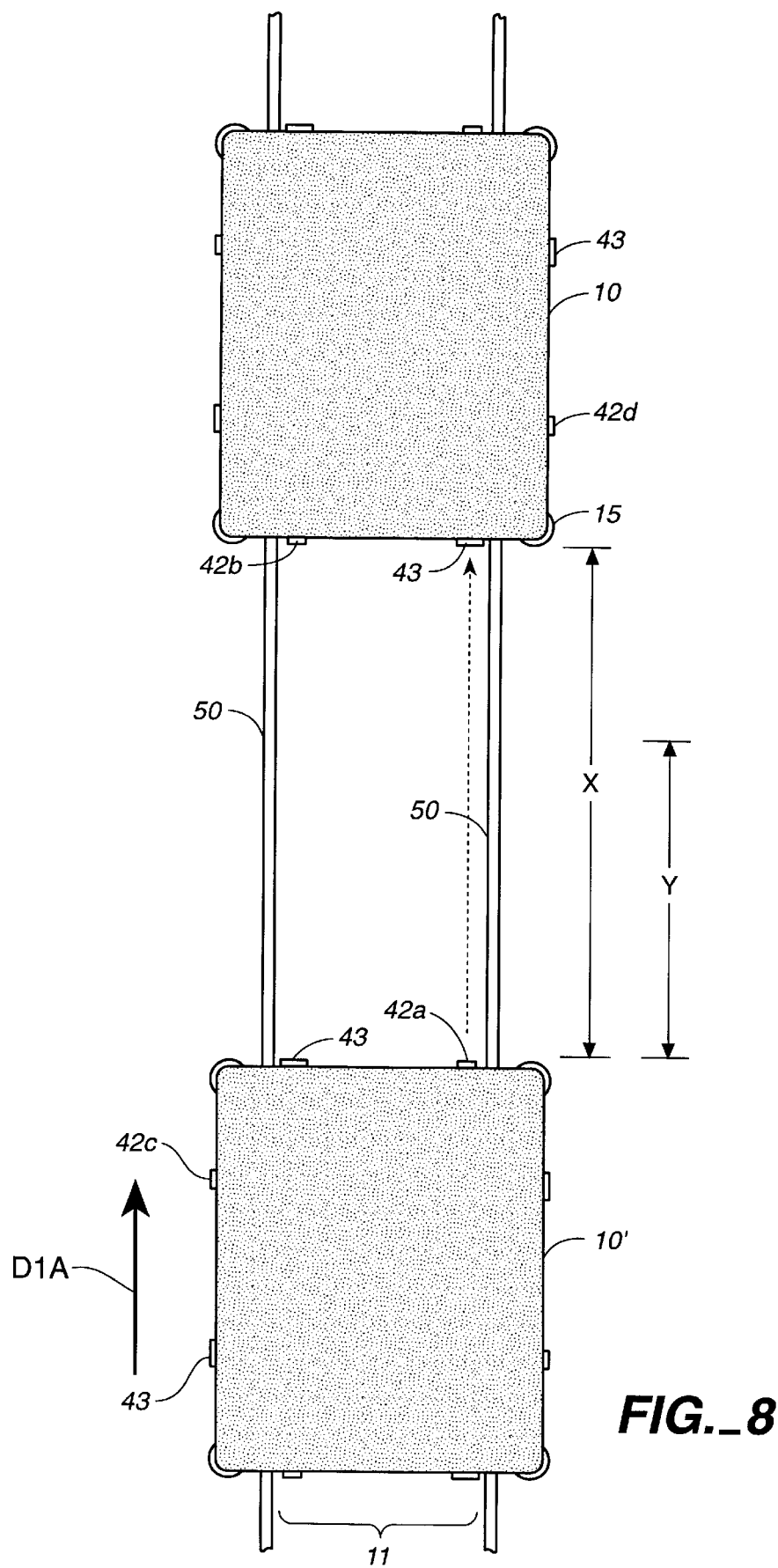
FIG._8

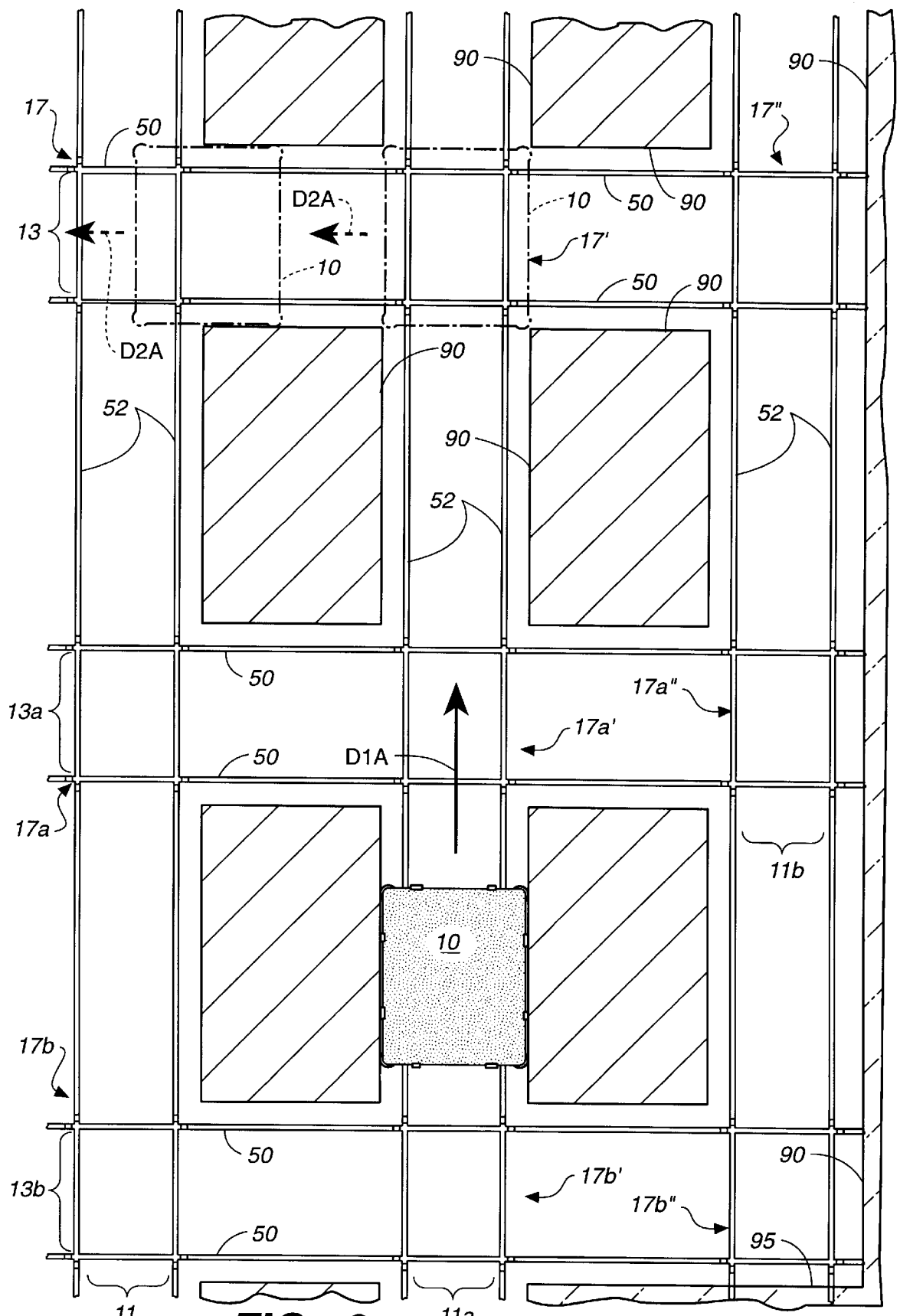
FIG._9

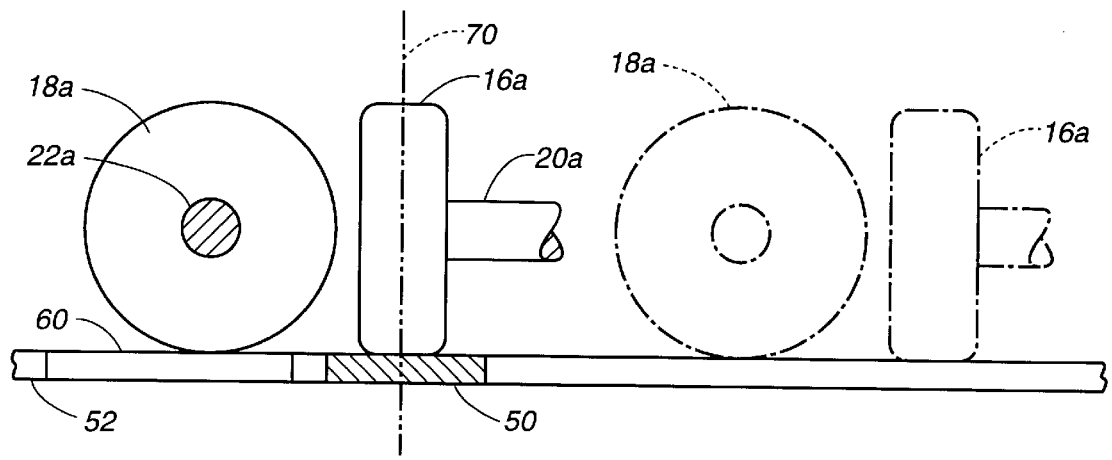
FIG._10A
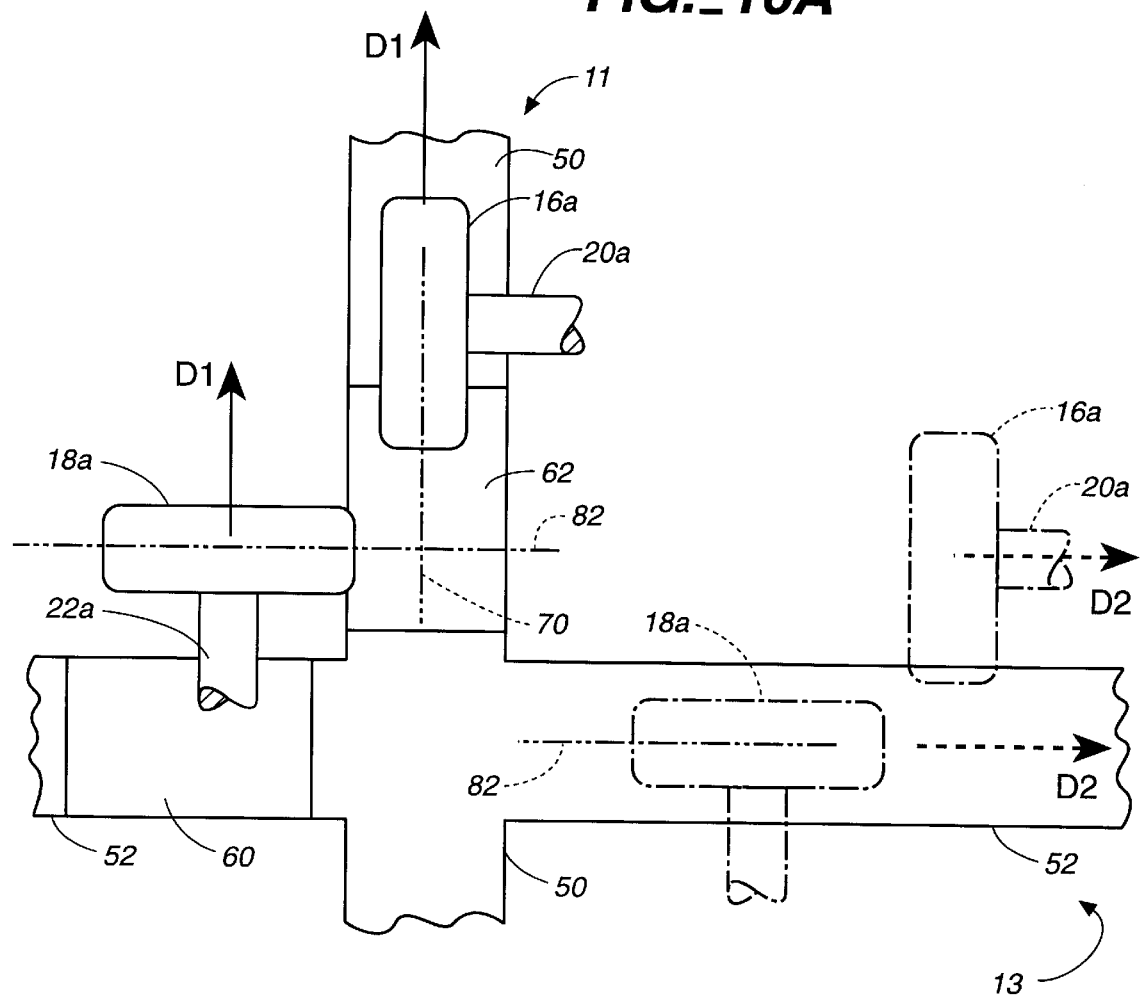
FIG._10B

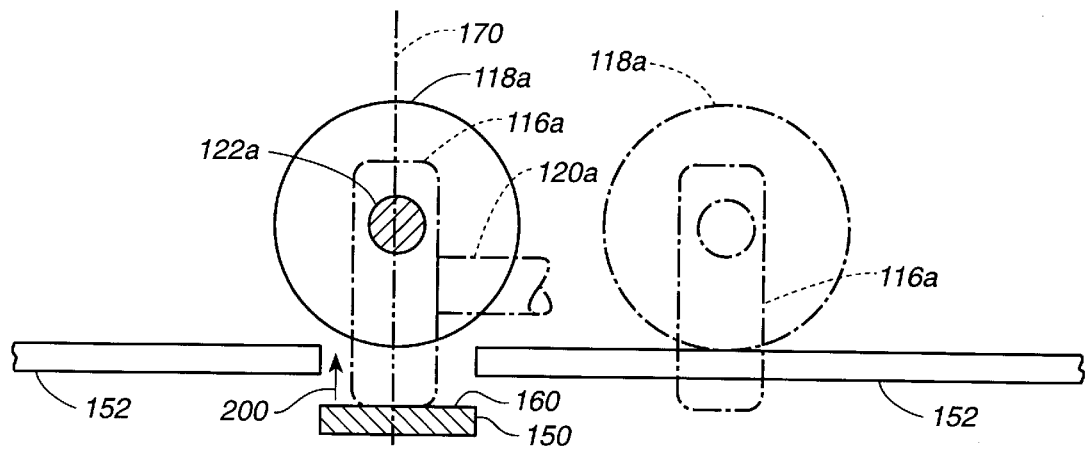
FIG._11A
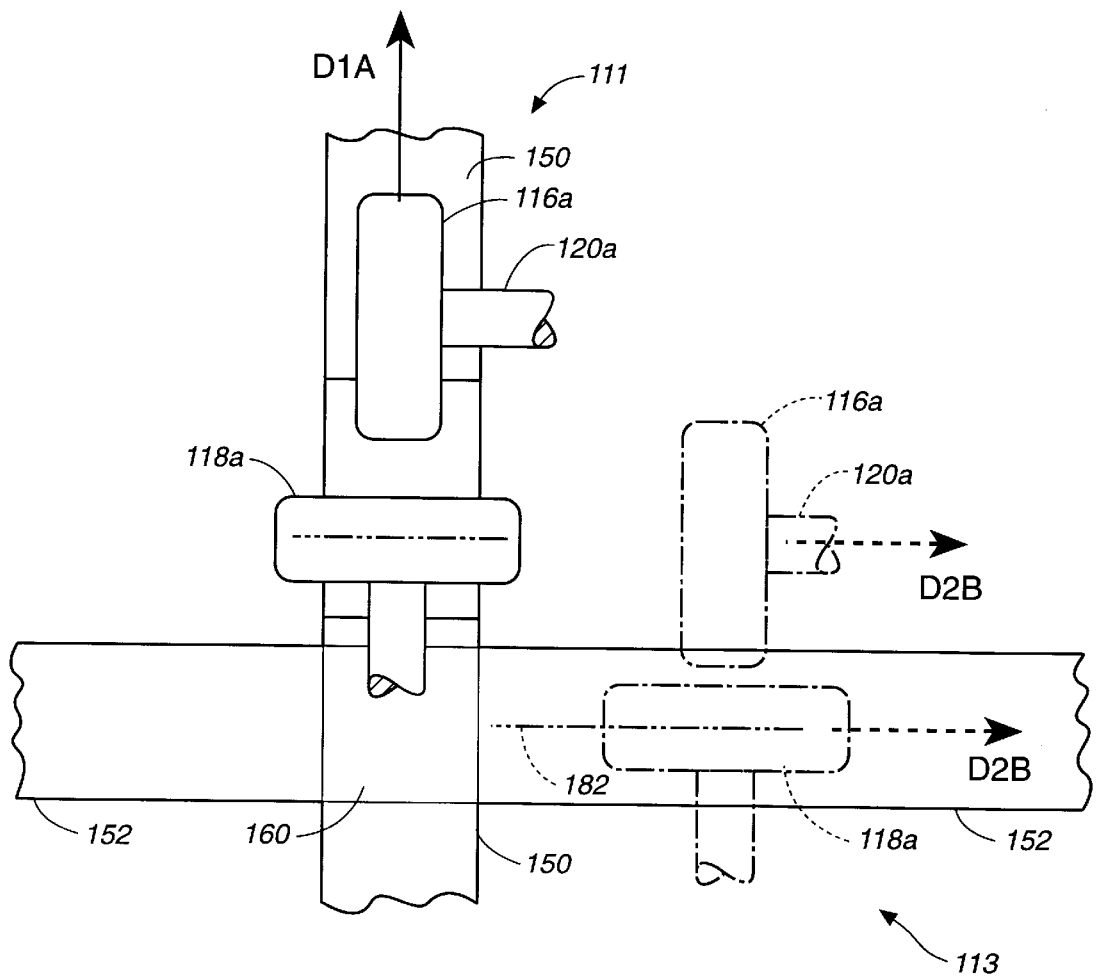
FIG._11B

METHOD AND APPARATUS FOR AUTOMATED POWERED PALLET

TECHNICAL FIELD

The present invention relates to powered pallets or motorized carriages of the type typically used in industrial applications for supporting and transporting loads or workpieces between processing and storage locations.

BACKGROUND OF THE INVENTION

Powered pallet assemblies are used in industry for supporting and moving loads, workpieces or objects thereon. These devices are typically shaped as rectangular platforms which move either with their wheels running directly upon a floor surface or upon parallel tracks. Powered pallet assemblies are especially useful for material handling in industrial settings for transporting loads, particularly to and from various assembly work sites, production locations and warehouse sites. Powered pallet assemblies have on-board assemblies, as distinguished from non-powered pallets which must be pushed or pulled into position, and powered pallet assemblies may be either directly or remotely controlled.

A minimum amount of free floor space is typically available in production areas in factories and warehouses, and in other areas where powered pallet assemblies are commonly used. Consequently, powered pallet assemblies are commonly required to navigate through tight spaces and to make tight turns. The smaller the area of floor space in which these pallet assemblies are able to change their direction, the more efficient these assemblies become in their use of floor space. Consequently, a need exists for powered pallet assemblies, or motorized carriages, which are able to change their direction of movement in very tight spaces having minimal available floor space.

When making turns or changing directions, present powered pallet assemblies usually must be advanced forward somewhat when turning so as to enable steering along an arc. To increase the efficiency of the floor used by such powered pallet assemblies, this turning arc may be made tighter, but problems quickly develop when designing systems to enable a powered pallet assembly to turn through tighter and tighter arcs. What would instead be desired is a powered pallet assembly which is able to stop, make an abrupt change in its direction of motion, and then start moving in this new direction, all without having to steer or turn the pallet assembly through any arc.

To change directions, prior art powered pallet assemblies typically use their own internal steering systems, which change the direction in which the pallet assembly's wheels are facing, or they use trackways which the pallet assembly's wheels passively follow, thus avoiding the need for an active steering system. Both of these options suffer from their own particular disadvantages.

The design complexity and cost of a powered pallet assembly increase dramatically when an internal steering system is added to steer the wheels of the pallet as a way of changing the direction of motion. What is instead preferred is a pallet assembly which does not require a complex and expensive internal steering system with its accompanying internal guidance system. An inherent disadvantage of powered pallet systems which employs steerable pallets is that such systems typically employ a plurality of these expensive pallets. Thus, the overall system cost increases dramatically as the number of pallets in the system with steerable controls is increased.

Complex internal steering systems can be avoided through the use of guide-rails or trackways upon which the powered pallets travel. All that is required is some form of drive assembly to rotate the wheels of the pallet assembly, thus causing the pallet to move along the trackways. The pallet wheels passively follow the trackways which effectively steer the pallet assembly. Unfortunately, trackway-based pallet systems often suffer from the disadvantage of not being able to easily turn the pallet assembly in a very tight arc. In the system of U.S. Pat. No. 5,044,283, for example, cornering modules are provided to enable movement of motorized carriages through relatively tight curves. In other rail-based pallet systems, the corners simply are not very tight, and in still others, for example, the turntable type of system of U.S. Pat. No. 4,416,202, floor space is required to accommodate the structure necessary for rotation of the trackway.

Consequently, a type of compromise problem exists in choosing between and expensive pallet assemblies having internal steering systems, which will enable the pallet to change directions within a smaller area, and the less complex trackway-based pallet systems which are unable to change the direction of motion of the pallet assembly within a small area. What is desired, therefore, is a powered pallet assembly which is able to use the best features of both of these designs, in particular, the ability to change directions abruptly using only a minimum amount of floor space without requiring a complex internal steering or guidance system.

A further important limitation exists in many prior art pallet systems. Pallet assemblies which are able to make turns requiring only a minimum amount of floor space correspondingly turn the objects placed upon the pallets. This problem exists, for example, in the system of U.S. Pat. Nos. 5,044,283 and 4,416,202. Such changing of the workpiece or load orientation can cause problems in certain production operations since the turning of the objects supported by the pallet assembly during pallet turning may result in these objects being misoriented from one step in a production process to a subsequent step. Consequently, what is desired is the further advantage of a powered pallet assembly that is able to change its direction of motion without changing the orientation of the objects being transported.

U.S. Pat. Nos. 2,469,575, 3,094,941 and 3,356,039 disclose trackway mounted carriages or platforms which can abruptly change direction without changing the orientation of the load which they are carrying. In these systems, however, the load-supporting wheel assemblies are either very difficult to couple to an on-board motor for driving of the pallet through the support wheels, or the systems employ elaborate switch assemblies, or both. U.S. Pat. Nos. 989,759, 3,348,497 and 4,516,504 are examples of other switch assemblies employed in trackway-based transport systems.

A powered pallet assembly is needed, therefore, which is able to change its direction of movement in very tight spaces. Specifically, this new direction of motion should include angles of up to 90° from the previous path of motion. The above should be done without having to steer the pallet assembly through any arc on the floor, and furthermore without the use of a complex internal steering apparatus, bulky turntables or complex switch assemblies. The pallet assembly further should be able to change its direction of motion without turning to face this new direction of motion, thus being able to move objects without rotating the orientation of the objects during changes of direction of the pallet assembly.

Still a further desirable feature of any powered pallet system is the ability to provide a system which will allow simultaneous operation of a large number of powered pallets. The pallets should be able to move around a trackway circuit and through various intersections in the circuit, with the movement of each of the pallets being individually controllable from a remote location, all while automatically preventing pallets from bumping into one another. Most preferably, such a system should not require complex communications apparatus on-board the pallets in order to be controlled by a central controller.

OBJECTS OF THE INVENTION

Accordingly, it is an object of the present invention to provide a powered pallet assembly having the ability to change its direction of motion in very tight spaces.

It is another object of the present invention to provide a powered pallet assembly which is enabled to stop, make an abrupt change to its direction of motion, and then start moving in this new direction, all without having to turn the pallet assembly.

It is a further object of the present invention to provide a powered pallet assembly which does not require its own internal steering system.

Another object of the present invention to provide a system for simultaneously operating a plurality of powered pallets around a trackway circuit and through various intersections in the circuit, with the direction and timing of movement of each powered pallet assembly being individually controllable from a central location without the need for communication apparatus on-board the pallets.

It is yet another object to provide a powered pallet system in which a plurality of powered pallets are automatically prevented from bumping into one another.

The powered pallet system of the present invention has other objects and features which are set forth below or will become apparent from the Best Mode of Carrying Out the Invention and accompanying drawing.

DESCRIPTION OF THE INVENTION

The trackway-based powered pallet system of the present invention comprises, briefly, a first trackway; a second trackway intersecting the first trackway; a powered pallet assembly supported for rolling movement on one of the trackways and having a pallet frame formed for support of a load thereon; a first plurality or set of wheels rotatably mounted to the frame for movement of the pallet assembly on the first trackway; a second plurality or set of wheels rotatably mounted to the frame and oriented at an angle to the first wheels and oriented for movement of the pallet assembly on the second trackway; a power drive assembly carried by the pallet frame and coupled to drive at least one wheel of the first wheels and coupled to drive at least one wheel of the second wheels; the first wheels being mounted to the frame in a manner enabling the first wheels to be disengaged from the second trackway when the pallet assembly is supported for movement on the second trackway by the second wheels; and the second wheels being mounted to the frame in a manner enabling the second wheels to be disengaged from the first trackway when the pallet assembly is supported for movement on the first trackway by the first wheels.

Also disclosed is the method of operating a powered pallet system comprising the steps of: propelling the powered pallet assembly along the first trackway using at least one wheel of the first set of load-supporting wheels while the second set of load-supporting wheels is disengaged from the first trackway; and propelling the pallet assembly along the second trackway using at least one wheel of the second set of load-supporting wheels while the first set of load-supporting wheels is disengaged from the second trackway.

In another aspect, the present invention includes the method of controlling the movement of a powered pallet assembly on a trackway including the steps of selectively moving the position of movable control members mounted proximate the trackway by using a remote controller, sensing the position of the movable control members, and controlling operation of a motor carried by the pallet assembly in response to the position of the control member which is sensed.

BRIEF DESCRIPTION OF THE DRAWINGS

FIG. 1 is a fragmentary, top perspective view of an intersection portion of a powered pallet system constructed in accordance with the present invention.

FIG. 2 is an enlarged, top perspective view of a switching assembly for alternatively raising and lowering trackway sections in the trackway intersection of FIG. 1.

FIG. 3A is an enlarged, broken-away top perspective view of a cam assembly for alternatively raising and lowering the trackway sections shown in FIG.2.

FIG. 3B is a top perspective view of the cam assembly as shown in FIG. 3A with the entire cam followers shown.

FIG. 4 is a bottom perspective view of a rectangular-shaped powered pallet assembly made in accordance with the present invention.

FIG. 5 is a top plan view, in cross section, of the powered pallet assembly of FIG. 4 with its top surface removed showing the internal components of the powered pallet assembly.

FIG. 6A is schematic, a side elevational view of the present powered pallet assembly and trackway showing the switching trackway sections in a first position.

FIG. 6B is a schematic, side elevational view of the present powered pallet assembly corresponding to FIG. 6A with the switching trackway sections in a second position.

FIG. 7A is an enlarged, side elevational view of the switching trackway sections and the pallet assembly wheels in the first position corresponding to FIG. 6A.

FIG. 7B is an enlarged, side elevational view of the switching trackway sections and the pallet assembly wheels in the second position corresponding to FIG. 6B.

FIG. 8 is a top plan view of a moving pallet assembly 10' approaching a stationary pallet assembly 10.

FIG. 9 is a plan view of a trackway grid or matrix with a pallet assembly, respectively, approaching an intersection, changing directions at the intersection and leaving the intersection.

FIGS. 10A and 10B are side elevation and top plan schematic views, respectively, of the upper left-hand corner of the trackway intersection of FIG. 1.

FIGS. 11A and 11B are side elevation and top plan schematic views, respectively, of an alternative embodiment of a corresponding corner the trackway intersection of FIG. 1.

BEST MODE OF CARRYING OUT THE INVENTION

Rather than steering pallet wheels, trying to use short radius curves or employing complex switch assemblies or turntables, the trackway-based pallet system of the present invention employs a powered pallet which has two sets of powered wheels and a relatively simple trackway system. The present powered pallet system enables trackway grids to be laid out which minimize the use of floor space and provide a transport system which is adaptable to a wide range of industrial and other applications.

Referring now to FIG. 1, a trackway-based power pallet system is shown in which a powered pallet, generally designated 10, is formed for rolling support on one of a first trackway, generally designated 11, and a second trackway, generally designated 13. In the preferred form, each of trackways 11 and 13 include a pair of spaced apart rails, namely, first trackway 11 is provided by a pair of rails 50 on which the pallet is supported and second trackway 13 is provided by a pair of rails 52. It will be understood, however, that trackways 11 and 13 also could be constructed as a single pallet-supporting rail or as one or more guide rails mounted proximate or along side a pallet-supporting surface. Trackways also can be constructed in which the pallet wheels, or the pallet, are guided by a groove or grooves and still be within the scope of the present invention.

In FIG. 1, pallet 10 is shown mounted on first trackway 11, and the trackways can be seen to be oriented so as to intersect each other, here at right angles in an intersection generally designated 17. Trackways 11 and 13 also may intersect at angles other than 90° if pallet 10 is correspondingly formed, as will be explained below. As best seen in FIGS. 4 and 5, powered pallet assembly 10 has two sets of load-supporting wheels, namely, a plurality of load-supporting first wheels 16a, 16b, and a plurality of load-supporting second wheels 18a, 18b. A pair of wheels 16a preferably are mounted to a common axle 20a, while an additional pair of wheels 16b preferably are mounted to a common axle 20b. It will be understood that the pallet wheels also can be independently supported from the pallet body or frame, generally designated 23. Similarly, second wheels 18a and 18b can be provided by a pair of wheels 18a mounted to common axle 22a and an additional pair of wheels 18b mounted to common axle 22b, with axles 22a, 22b being mounted in bearings carried by pallet frame 23.

It is an important feature of the present invention that load-supporting wheels 16a, 16b and 18a, 18b need not be steerable and most preferably can be mounted to the pallet framework in a fixed position. The present invention avoids the necessity of mounting the support wheels for pivotal movement about a vertical axis to enable steering and, more importantly, eliminates the necessity of providing a wheel steering mechanism.

In the pallet system of the present invention, pallets 10 are powered. Thus, each pallet 10 has an on-board drive train assembly which advantageously includes a motor 30, drive shaft 32, gear box 34, output shafts 36 and 38, and drive belts 37 and 39 which are entrained around pulleys 31 and 35 carried by axles 20a and 22a, respectively. As will be seen from FIG. 5, therefore, the pallet drive assembly is coupled to drive at least one wheel in each of the first and second sets of load-supporting wheels. As shown in the preferred embodiment, the drive assembly powers a pair of wheels 16a in the first set of load-supporting wheels and a pair of wheels 18a in the second set of load-supporting wheels. Broadly, the pallet drive assembly also includes programmable logic controller 44 and motor controller 135.

The need to steer load-supporting wheels 16a, 16b and 18a, 18b of pallet assembly 10 in the present invention has been eliminated by the manner in which the load-supporting wheels are mounted to pallet frame 23a. Second set of wheels 18a, 18b are mounted to pallet frame 23 at an angle to the first set of wheels 16a, 16b which substantially matches the angle of intersection of first trackway 11 and second trackway 13. Moreover, second set of wheels 18a, 18b is further mounted to frame 23 in a manner which enables pallet 10 to move along, or reciprocate, in a first plane or direction, as indicated by arrow D1 in FIG. 1. This motion along first trackway 11 occurs with second set of wheels 18a, 18b disengaged from first trackway 11. Moreover, first set of wheels 16a, 16b are mounted to pallet frame 23 in a manner which enables pallet 10 to move along, or to reciprocate, in a second plane or direction, as indicated by arrow D2 in FIG. 1. Motion along second trackway 13 occurs with first set of wheels 16a, 16b disengaged from second trackway 13. Thus, rather than steering wheels 16a, 16b, 18a, 18b, the load-supporting wheels are arranged on or mounted to pallet frame 23 in a manner which allows the first set of wheels 16a, 16b to rollingly support the pallet on first trackway 11, while the second set of wheels 18a, 18b are out of contact with the first trackway. Conversely, the second set of wheels 18a, 18b rollingly support the pallet on second trackway 13 while the first set of wheels is out of contact with the second trackway.

There are several arrangements which will be suitable for mounting of the load-supporting wheels to the pallet frame so as to disengage one set of wheels while the other set supports and drives the pallet. In the preferred embodiment of FIGS. 1, 4 and 5, all of wheels 16a, 16b, 18a, 18b are mounted for rotation in substantially vertically oriented planes. Such orientation is not required to practice the present invention, but it is a conventional orientation which is relatively low in cost to construct.

As best seen in FIG. 5, in the first set of wheels a first pair of wheels 16a, 16b are aligned in a first plane, as indicated by phantom line 70 and a second pair of wheels 16a, 16b are aligned in a second plane, as indicated by phantom line 72. Planes 70 and 72 are parallel to one another and spaced apart by a distance substantially equal to the distance between rails 50 in first trackway 11. First wheels 16a, 16b, therefore, support and drive powered pallet assembly 10 back-and-forth in first direction D1, which is also parallel to planes 70 and 72. The second plurality of wheels 18a, 18b are oriented and rotate in two planes 80 and 82. Planes 80 and 82 also are substantially parallel to one another and spaced apart by a distance substantially equal to the distance between rails 52 of second trackway 13. Thus, wheels 18a, 18b are able to support and drive powered pallet assembly 10 back-and-forth in a second direction D2 which is also parallel to planes 80 and 82. Preferably, directions D1 and D2 are mutually perpendicular, however, it is understood that they may intersect at some other angle other than 90° and still keep within the scope of the present invention. In such a case, the angle between intersecting trackways 11 and 13, and thus directions D1 and D2, will also not be perpendicular, with the same corresponding non-perpendicular angle being required in the angle between planes 70, 72 and planes 80, 82.

In the preferred embodiment, first wheels 16a and 16b and second wheels 18a, 18b all protrude equi-distantly through openings 19 in bottom wall 21 of pallet assembly 10, as is best seen in FIGS. 6A and 6B. As can be seen from FIG. 5, axles 20a and 20b are parallel to one another and axles 22a and 22b are parallel to one another. Moreover, axle 20a is substantially parallel to and laterally offset or displaced relative to plane 82, while axle 20b is substantially parallel to and laterally offset or displaced relative to plane 80.

Similarly, axle 22a is substantially parallel to and laterally offset or displaced relative to plane 70, while axle 22b is substantially parallel to and laterally offset or displaced relative to plane 72.

Referring now to FIGS. 10A and 10B, it will be seen that by laterally offsetting axle 22a for second wheel 18a from plane 70, second wheel 18a is disengaged from rail 50 as first wheel 16a rollingly supports and drives the pallet in direction D1 along rail 50 of first trackway 11. Moreover, as can be seen from the dotted line position in FIG. 10B, when the pallet moves in direction D2 along rail 52 of trackway 13, laterally offsetting or positioning axle 20a relative to plane 82 causes wheel 16a to be disengaged from rail 52 as the pallet is supported and driven along second trackway 13 by second wheel 18a.

The lateral positioning or offsetting of the location of the axle of one set of wheels relative to the plane of rotation of the other set of wheels can be on either side of the plane of rotation of the other set of wheels, and the amount of the offset need only be sufficient for the offset wheels to clear or be disengaged from the rails which are supporting the pallet for movement. Obviously, the illustration in FIGS. 10A and 10B is for only the upper left-hand corner of the FIG. 1 intersection, and it would be repeated for the other corners, although reversed on the other side of the intersection.

Another embodiment of the present pallet assembly which enables one set of wheels to be disengaged while the other drives and supports the pallet is shown in FIGS. 11A and 11B. First wheels 116a are rollingly supported on a rail 150 of a first trackway 111. As will be seen from FIG. 11A, axle 122a of second wheel 118a is positioned on plane 170a of rotation of wheel 116a. Thus, there is no lateral displacement or offset of second wheel 118a from the point of contact or plane of rotation of the first wheel 116a with rail 150. However, the lowermost point of wheel 118a can be seen to be vertically upwardly offset relative to point of contact of first wheel 116a with rail 150.

As wheel 116a rollingly supports the pallet along rail 150 of first trackway 111, therefore, second wheel 118a is elevated and out of engagement with rail 150. For driving along rail 152 of second trackway 113, first wheel axle 120a can be seen in FIG. 11B to be laterally offset relative to plane 182. Such lateral offset can be the same as for the embodiment of FIGS. 10A and 10B. This embodiment requires an upwardly movable track or rail section 160 at the intersection of rails 150 and 152 to support wheel 118a as it rolls across downwardly offset rail 150. Wheel 118a can be seen to be below the top surface of rail 152 in FIG. 11A so that when movable section 160 is raised to trackway 152, as indicated by arrow 200, wheel 116a is slightly lifted above track 150, which enables wheel 118a to drive the pallet down rail 152.

In the embodiment of FIGS. 11A and 11B, the wheels 116a and 118a have the same diameter, which facilitates driving at the same speeds without speed reduction mechanisms, but it will be understood that first wheels 116a also could be of larger diameter than second wheels 118a to effect an offset. The embodiment of FIGS. 11A and 11B is less preferred than that of FIGS. 10A and 10B because it requires that the first and second trackways be at different elevations, but only four vertically displaceable track sections 160 are required at an intersection, instead of the eight of FIG. 1.

Finally, it also is possible to movably mount both set of wheels to frame 23 so that one set of wheels can be moved to a position out of engagement with the trackway on which the other set of wheels is supporting the pallet. The disadvantage of this approach is that the wheels have to be selectively movably mounted to the pallet frame, which requires on-board wheel displacement mechanisms. Obviously, one also could movably mount one set of wheels and laterally offset the other set of wheels so as to disengage the non-supporting wheels from the trackway which is supporting the pallet. As used herein, therefore, the sets of load-supporting wheels may be mounted to the frame in a manner adapted for movement of the pallet along each of intersecting trackways with the wheels not aligned with the trackway disengaged from the trackway, which broadly includes offset wheel sets, movable wheel sets, and combinations of offset and movable wheel sets.

Returning now to the power drive assembly, one of the advantages of disengaging one set of wheels is that the load-supporting wheels of both sets can be driven simultaneously. Thus, as seen in FIG.5, a single motor 30 causes rotation of a shaft 32, which is connected to a gear box 34. Output shafts 36 and 38 of gear box 34 have pulleys mounted thereon, and rotation of shaft 36 drives belt 37 and pulley 31 carried by axle 20a. Similarly, the rotation of output shaft 38 causes movement of belt 39, which in turn causes rotation of pulley 35 on axle 22a. As can be seen, therefore, the operation of a single motor 30 will drive perpendicular axles 20a and 22a simultaneously. Since one set of wheels will always be disengaged from the trackways when the shafts 20a and 22a are being driven, the disengaged but rotating wheels will not interfere with the desired pallet operation. This important feature of the present invention avoids the need for two different motors with two separate drive trains. Instead, only a single motor is required to drive pallet assembly 10 in both directions D1 and D2. Also avoided in the present design is the need for differential gearing. Simply changing the direction of rotation of the motor 30 will operate to change the direction of rotation of both of axles 20a and 22a. This will enable the pallet assembly to be moved easily back-and-forth in either of perpendicular planes or directions D1 and D2.

More specifically when motor 30 turns shaft 32 in one direction of rotation, axle 22a will operate to advance pallet assembly 10 in direction D2A and axle 20a will be rotated to advance pallet assembly 10 in direction D1A.

Conversely, when motor 35 turns shaft 32 in the opposite direction of rotation, axle 22a will operate to advance pallet assembly 10 in direction D2B and simultaneously axle 20a will be rotated to advance pallet assembly 10 in direction D1B. Thus, by rotating shaft 32 in either of a forward and a reverse direction, the pallet may be powered in any of four directions (D1A, D1B, D2A, D2B). This feature considerably simplifies controlling the direction of movement of pallet assembly 10.

It is understood to be within the scope of the present invention that axles 20b and 22b could similarly be connected to the pallet drive assembly by the use of pulleys and belts coupled to gear box 34, or that axles 20a and 22a could be connected by pulleys to axles 20b or 22b such that axles 20b and 22b would also be powered to rotate upon engagement of motor 30. This type of arrangement would enable all four of either wheels 16a, 16b and wheels 18a, 18b to be driven.

The direction of motor rotation is controlled by a motor controller 135, which is in turn controlled by input from a programmable logic controller 44, (hereafter "PLC 44"). Batteries 131 are connected to motor controller 135 and PLC 44 by wires 33 to provide a source of power.

The movement of pallet 10 is also controlled by a series of sensors or photoelectric eyes 42a–42d and 45a, 45b on the pallet assembly, which are electrically connected to PLC 44 by conductors 136, and by the presence of motion control members including reflective strips 65 and by movable reflective flags 46a, 46b, 63a, 63b, 63c and 63d (seen in FIG. 1), placed at various locations proximate the trackway and particularly intersection 17, as will be explained below.

The trackway structure of the present invention also must be constructed in a manner which allows the pallet assemblies to move through intersection 17 and to be switched selectively from one trackway to another. The mechanism for both switching trackways and avoiding contact between the non-driving wheels and trackways at the trackway intersections is best seen in FIGS. 2, 3, 6 and 7. Specifically, movable track or rail sections 60 in rails 52 and movable track sections 62 in rails 50 are provided to accomplish this function. When in a raised position, track sections 62 act as part of trackway 50. Similarly, when in a raised position, track sections 60 act as part of rails 52.

As is best seen in FIG. 6A and 7A, track sections 60 can be moved to a lowered position, and in this lowered position, second wheels 18a, 18b will not contact or engage crossing rails 52 of the second trackway. This enables wheels 16a, 16b to move pallet assembly 10 freely back-and-forth along direction D1 through intersections 17 of trackways 11 and 13 while wheels 16a, 16b rest firmly upon parallel rails 50. Consequently, whenever track sections 60 are in their lowered position, pallet assembly 10 will be able to move through intersection 17 although second wheels 18a, 18b project downwardly to the same level as wheels 16a, 16b. Moreover, passage of the pallet assembly through intersection 17 on first trackway 11 occurs notwithstanding that second wheels 18a, 18b are rotating simultaneously with driving wheels 16a, 16b at all times when the pallet assembly is moving through the intersection. Movement of track sections 60 to the lowered position eliminates possible interference problems as wheels 18a, 18b simply rotate freely in the air and are not able to contact rails 52 of the second trackway.

Correspondingly, as is best seen in FIGS. 6B and 7B, track sections 60 alternatively can be placed in a raised position and a lowered position. In the raised position second wheels 18a, 18b contact rails 52 thus allowing for back-and-forth motion along second trackway 13 in direction D2. When track sections 62 are moved to a lowered position such that first wheels 16a, 16b are not able to contact rails 50 of first trackway 11. This allows for unhindered back-and-forth motion of pallet 10 in direction D2 despite the fact that first wheels 16a, 16b are rotating simultaneously with second wheels 18a, 18b, since first wheels 16a, 16b are not able to contact rails 50 as the pallet moves through intersection 17 on the second trackway. By having the track cam assembly 180° out of phase, track sections 60 can all be raised when track sections 62 all are lowered, and conversely, track sections 62 can all be raised when track sections 60 all are lowered. Consequently, pallet assembly 10 is enabled to move along either of trackways 11 or 13 through intersection 17.

Additionally, movable track sections 60 and 62 provide a trackway switching assembly. Pallet 10 can be brought into intersection 17 along one of trackways 11 and 13 and stopped with the wheels 16a, 16b, 18a, 18b positioned over track sections 60 and 62. The pallet will be supported on the raised ones of track sections 60 and 62. Then, the raised track sections will be lowered and the lowered track sections will be raised, and the pallet can exit intersection 17 at a perpendicular direction from the trackway on which it entered the intersection.

The preferred mechanism for alternatively raising and lowering track switching sections 60 and 62 is best seen in FIGS. 2, 3A, 3B, 7A and 7B. A rotatable cam assembly, generally designated 250, is positioned underneath movable track sections 60 and 62. Cam assembly 250 is located at each of the four corners of intersection 17, as shown in FIG. 2, but the cams can be driven by a single actuator 175. A pair of parallel cam shafts 165 are provided with one at each of the opposite sides of intersection 17 of trackways 11 and 13. As is best seen in the enlarged views of FIG. 3A and 3B, cams 260 and 262 are provided at the ends of cam shafts 165. Track sections 60 and 62 are carried by pivoted arms or cam followers 60a and 62a which follow or are driven by cams 260 and 262, respectively. As seen in FIG. 2, cam shafts 165 run generally parallel to one of the trackways, in this case first trackway 11 and rails 50. Rollers 164 extend from a lower end of follower arms 62a and rollers 166 extend from a lower end of follower arms 60a. Rollers 164 and 166 are designed to provide rolling contact between cams 260 and 262 and follower arms 60a and 62a such that when cams 260 and 262 rotate, track sections 60 and 62 easily move up and down as desired.

Cam follower arms 60a and 62a preferably are pivoted about axle 167. Accordingly, cams 260 and 262 will alternatively raise and lower track sections 60 and 62 between a first and a second position, as shown in FIGS. 6A and 6B and FIGS. 7A and 7B, respectively, as each cam shaft 165 rotates. Cams 260 and 262 are oriented about 180° out of phase, which will cause the lowered track section (either 60 or 62) to be raised before the other corresponding track section (either 62 or 60) is lowered. This occurs, for example, when cam shaft 165 and cams 260 and 262 are rotated in a clockwise direction by 90° from the position shown in FIG. 7B. In this way, when the pallet is stopped at the intersection the pallet is first supported on one set of wheels, e.g., wheels 18a, 18b (FIG. 7B). Rotation of the cam shaft clockwise by 90° causes all of wheels 16a, 16b and 18a, 18b to be simultaneously supported. Rotation of cam shaft 165 90° move in a clockwise direction lowers arm 60a and leaves arm 62a in a raised position (FIG. 7A) and pallet assembly 10 is thereby switched for movement along the other trackway, all without dropping or jarring the pallet during the switching process.

The rotation of cam shafts 165 advantageously can be controlled by the reciprocal movement of bar 170 which alternatively pushes and pulls gear racks 168 and thereby turns pinion gears 169, which are attached to cam shafts 165. The alternating back and forth motion of bar 170 in turn may be controlled by a single actuator 175. By alternately moving bar 170 between a first and second position, track sections 60 and 62 are alternatingly raised and lowered simultaneously at all four corners of intersection 17 of trackways 11 and 13. Actuator 175 can be a solenoid or hydraulic or pneumatic actuator and would be coupled at 275 to a computer controller 285 at a remote location.

As will be discussed, a plurality of trackway intersections can be added to provide a grid of trackways along which pallets 10 may be operated. Accordingly, a number of different actuators 175, each disposed at a separate trackway intersection 17, 17a, 17b, etc. (FIG. 9), could all be under the control of central remote controller device 285. Using this design, a plurality of trackway intersections could be remotely and simultaneously controlled by the central remote controller such that a plurality of pallet assemblies 10 could individually be controlled to move at different times and along different paths through the various trackway intersections. This provides a very flexible yet centralized, remotely controlled system for simultaneously, yet individually, controlling the movement of a plurality of pallets.

An automatic crash-prevention system is also provided in the present system to automatically prevent each pallet assembly 10 from bumping into one another, for example, in the case where a plurality of pallets 10 are simultaneously or sequentially moving in the same trackway grid. As is best seen in FIGS. 4 and 5, each pallet 10 is provided with a plurality of proximity sensors which preferably take the form of photoelectric eyes 42*a*, 42*b*, 42*c* and 42*d* oriented to sense the presence of proximate objects on each of the sides of powered pallet assembly 10. As shown in the drawing, pallets 10 are rectangular but they can have other polygonal shapes or be round, oval or irregularly shaped. Sensors 42*a*–42*d* are oriented to sense proximate objects in any of the directions of movement of the pallet, namely, the four directions D1A, D2A, D1B and D2B. Moreover, sensors 42*a*–42*d* are most preferably mounted to the pallet in off-center locations, that is, offset from central planes through the pallet as shown in FIG. 5. Specifically, photoelectric eye 42*a* is oriented on one side of a central plane passing through pallet 10 to watch in the direction D1A. Correspondingly, eyes 42*b*, 42*c* and 42*d* are respectively oriented on one side of central planes passing through the pallet to watch in directions D1B, D2A and D2B. Eyes 42*a*–42*d* are proximity sensors specifically designed to watch for the presence of a reflective target. When the pallet closely approaches a reflective target, photoelectric eyes 42*a*–42*d* "see" the reflective surface and signal PLC 44 to stop the movement of the pallet assembly.

Tape strips 43 are formed of such a reflective material and are positioned on the sides of each pallet 10 also in an offset location. Reflective material enhances the valid signal to noise ratio although shiny pallet surfaces could also be used. By positioning eyes 42*a*–42*d* and reflective strips 43 at correspondingly offset locations, this enables any photoelectric eye 42*a*–42*d* to line up directly with a reflective strip 43 positioned on another pallet assembly when two pallets are traveling along a common trackway (FIG. 8) or at a trackway intersection. Additionally, by positioning sensors 42*a*–42*d* and reflective strips 43 on the sides of pallet assemblies at the offset locations shown in FIGS. 4 and 5, respective eyes 42*a*–42*d* will not "see" or be aligned with each other.

In FIG. 8 pallet 10 is stationary and is being approached by a moving pallet 10' which is moving in direction D1A. In this example, photoelectric eye 42*a* on pallet 10' will detect the presence of reflective strip 43 on pallet 10 at a distance X. Eye 42*a* will then signal PLC 44 to stop the forward motion (in direction D1A) of pallet assembly 10'. Accordingly, pallet assembly 10' will then slow down and stop over a stopping distance Y. By calibrating the sensitivity of eye 42*a* and by programming PLC 44 for the known stopping capability of pallet assembly 10', the distance Y can be set to always be somewhat less than distance X. This ensures that moving pallet 10' automatically stops before hitting stationary pallet 10. Should the stationary pallet 10 later be moved away from pallet 10', eye 42*a* will no longer sense the presence of reflective strip 43, and eye 42*a* will signal PLC 44 and consequently pallet 10' will resume movement in its original D1A direction.

Remote central control of the switching of pallets 10 on a trackway grid also is accomplished in the present invention by using proximity sensors. For switching, the proximity sensors are used in combination with stationary and movable pallet motion control members at the grid intersections. A number of movable motion control members, such as reflective "pop-up" targets 63*a*–63*d*, (shown only in FIG. 1, and omitted for clarity from the other FIGS.), function basically in the same way as reflective strips 43 on the pallets. Specifically, when approached by a photoelectric eye or sensor 42*a*–42*d*, movable flags or targets 63*a*–63*d* can also be used to stop the movement of pallet 10 precisely at trackway intersections so as to permit switching.

Reflective motion control members or targets 63*a*–63*d* are individually remotely controllable by controller 285 through electrical conductors 290. They include actuators, not shown, which can be used to selectively cause the targets to "pop-up" proximate trackway intersection 17. Reflective target 63*b*, shown in an elevated or popped-up position, will be sensed by photoelectric eye 42*b* when pallet 10 is moving toward intersection 17 along first trackway 11. When in a retracted position (e.g., as shown for reflective target 63*a*), pallet assembly 10 will pass over retracted target 63*a* and enter trackway intersection 17. When sensor 42*b* senses the reflective motion control member or target 63*b*, (which is remotely controlled by controller 285 to pop up in its path), the sensor will signal PLC 44 to stop motor 30 and pallet assembly 10 will begin to slow down and eventually stop. By individually remotely controlling the action of four pop-up reflective targets 63*a*–63*d*, stopping of a pallet assembly 10 at a position nearly centered over the top of trackway intersection 17 can be achieved regardless of the direction from which pallet assembly 10 approaches the intersection. Moreover, it is not necessary to remotely communicate directly to any of the drive componentry of the pallet assembly to try to remotely control the pallet motor in order to stop at a trackway intersection. By positioning retractable reflective targets 63*a*–63*d* at the distance X from the side of a trackway intersection, pallet assembly 10 can be stopped in distance Y, thereby being quite near to being centered over trackway intersection 17.

Precise alignment and centering of pallet 10 directly over trackway intersection 17, such that wheels 16*a*, 16*b* and 18*a* and 18*b* are properly aligned over switching track sections 62 and 60, respectively, is achieved by the use of an additional set of downward facing sensors or electronic eyes 45*a*, 45*b* (best seen in FIGS. 4 and 5). Sensors 45*a* and 45*b* operate in combination with stationary reflective motion control flags or strips 65 and movable reflective motion control flags 46*a*, and 46*b*.

Sensors 45*a*, 45*b* are preferably oriented to look downward from the bottom of each pallet, watching for the presence of either of the reflective tape strips 65, which can be positioned at a fixed in location in the intersection 17. Sensing of the pressure of reflective strips 65 by sensors 45*a*, 45*b* sends a signal to PLC 44 which causes PLC 44 to operate motor 30 in a "crawl" mode, i.e. to slowly advance the pallet. Thus, when sensor 42*b* senses pop-up target 63*b*, motor 30 is shut down and the pallet begins to coast toward a stop. However, as sensor 45*b* passes over the front end 100 of strip 65, it sends a signal to PLC 44 which overrides the signal from sensor 42*b* and turns on the motor in crawl mode. Pallet assembly 10, therefore, does not stop but instead continues to move slowly or crawl forward. PLC 44 is further programmed for slow forward motion to occur only when both of an eye 42*a*–42*d* and an eye 45*a*, 45*b* simultaneously detect the presence of a reflective tape. Should one of eyes 42*a*–42*d* not first detect the presence of a reflective strip (43 or 63*a*–63*d*), PLC 44 is programmed to have pallet assembly 10 continue at a normal rate of speed through trackway intersection 17, regardless the detection by sensors 45a, 45b of reflective strips 65, as sensors 45a, 45b will, of course, always detect the presence of reflective strips 65 whenever the pallet assembly passes through a trackway intersection.

Pallet assembly 10 will continue to crawl forward toward pop-up target 63b until sensor 45b reached the rear end 110 of tape 65. At that point motor 30 will be shut down and the body of pallet 10 will physically contact or bump into target 63b at very low speed to precisely stop pallet 10 in the position over the intersection necessary for switching. By precisely positioning end 110 of reflective tape strips 65 and contacting targets 63a–63d, it is possible to precisely center the stopping of pallet assembly in the trackway intersection with first wheels 16a, 16b and second wheels 18a, 18b aligned over switching track sections 62 and 60, respectively.

When pallet 10 is centered over intersection 17, sensors 45a, 45b also are positioned over movable flags 46a, 46b which also are remotely controlled by controller 285 through conductors 295. Flags 46a, 46b can be laterally moved, as indicated by arrows 90, into a position under sensors 45a, 45b so as to be seen by downward facing sensors 45a, 45b. Flags 46a, 46b also can carry a reflective tape similar to the reflective tape of strips 43, 65 and targets 63a–63d. Flags 46a, 46b can be mounted under an opening in the trackway surface so that they are only seen by sensors 45a, 45b when the flags are moved from a position out of alignment with the opening to a position aligned with the opening. The illustration in FIG. 1 of movable flags 46a, 46b is schematic and does not include the opening or actuator for movement of the flags.

PLC 44 is programmed such that when pallet assembly 10 is already stopped and centered exactly over the trackway intersection, and sensor or photoelectric eye 45b detects a flag 46b therebelow, motor 30 is signaled to drive wheels 16a, 16b and 18a, 18b in directions D1A and D2A, respectively. Alternately, if eye 45a detects flag 46a, motor 30 is signaled by PLC 44 to drive wheels 16a, 16b and 18a, 18b in directions D1B and D2B, respectively. Accordingly, flags 46a, 46b will be moved to a position so that they are not seen by sensors 45a, 45b when the pallet is being stopped in the intersection for switching. Once switch of track sections 60 and 62 has occurred, one of flags 46a, 46b will be moved by controller 285 to a position under one of sensors 45a, 45b to start motor 30 and drive pallet 10 out of intersection 17.

As a result of having its wheels driven simultaneously in two mutually perpendicular directions (for example: D1A and D2A or D2A and D2B), only two movable flags 46a, and 46b are required to be used in conjunction with trackway switch sections 60 and 62, and pallet 10 may be moved in any of four directions (D1A, D1B, D2A and D2B) by a combination of selection of the position of flags 46a, 46b and the position (raised or lowered) of track sections 60 and 62 by controller 285.

Accordingly, the pallet assembly 10 can be initially placed upon the trackway as shown, or it can be positioned upon the trackway at an orientation rotated 180° to that shown, all without affecting the control of the switching of the pallet assembly at the trackway intersections. Rotation of pallet 10 by 180° still ensures that a downward-looking sensor 45a, 45b will be positioned over flags 46a, 46b. In fact, the rotating of power pallet assembly 10 by 180° would simply move eye 45a to the position presently occupied by eye 45b and vice versa. This rotation would not affect the control logic and direction of movement at intersections of the present system. It is immaterial which eye 45a, 45b actually first detects movable flag 46a, 46b.

Accordingly, a plurality of pallet assemblies can be placed upon the trackway with some facing one direction and some facing an opposite direction, all without affecting the coordinated operation of the present system. This is one of the advantages of forming first trackway 11 and second trackway 13 with different widths. The differing trackway widths ensure that the pallets can only be rotated by 180° and placed on a trackway. If the trackways are of the same width, four downward looking sensors or photoelectric eyes would be required, as the individual pallet assemblies could be easily rotated 90°, as well as 180° when placed upon the trackway.

Preferably, movable flags 46a, 46b, cam mechanisms 250, and pop-up reflective targets 63a–63d are all remotely controllable by the same remote controller 285 such that the timing and direction of movement of individual pallets at one trackway intersection, or around a trackway circuit and through various trackway intersections, are all controlled without having to remotely communicate with any of the internal components of a particular pallet assembly 10.

In order to ensure laterally positioning of pallets 10 over rails 50 and 52, it is preferable that guide elements, most preferably guide wheels 15, be provided on pallet assembly 10 to contact and run along a guide surface, such as walls 90 and 95. These guide walls laterally steady the pallet assembly in its back and forth movement and also prevent it from turning or twisting. When traveling along any trackway, wheels 15 are in rotating contact either with walls 90 or 95. When moving through intersection 17, pop-up guide rails, not shown, can be provided, which also are activated by controller 285, for lateral guidance through the intersection.

Accordingly, the present invention provides a simple apparatus for a powered pallet assembly enabled to move in one direction on a trackway, stop, make an abrupt change to a perpendicular direction, then start moving along a new trackway, all without the pallet assembly turning or requiring any complex internal steering or guidance mechanisms. Due to this simplicity, the pallets of the present invention are much cheaper than computer-controlled, steerable, pallets found in the prior art.

FIG. 1 illustrates an intersection 17 between two perpendicular, crossing trackways. As stated above, it is to be understood that additional intersections could be added to the layout or trackway grid of the present invention and the intersections can take other forms, for example, T-shaped intersections at the edge of a grid. Adding more intersections enables the pallet assembly to change directions at additional locations. Such a layout is shown in FIG. 9 wherein three parallel first trackways 11 and three parallel second trackways 13 are provided. In such an arrangement, the powered pallet assembly 10 is shown in solid lines in FIG. 9 moving toward the intersection 17a'. Pallet assembly 10 is shown in broken lines as stopped at intersection 17', and is also shown in broken lines moving out of intersection 17' toward intersection 17 at an angle of 90° from the direction pallet assembly 10 had entered intersection 17'. Additional powered pallet assemblies 10 could also be added to the grid and used simultaneously upon such a layout, with directional changes of the powered pallet assemblies being computer-controlled by a single controller 285 and movable switch assemblies and movable motion control members. As also will be seen from FIG. 9, T-shaped intersections 17" and 17a" are provided along a right-hand edge of the trackway grid and an L-shaped intersection 176" is provided at the lower right-hand corner. As will be understood; the wall 90 at T-shaped intersections 17" and 17a", can include a reflective strip which is permanently fixed in an "up" position similar to targets 63a–63d and wall 95 at L-shaped intersection 176" can include a similar reflective tape to control switching.

Having set forth the preferred embodiment of the apparatus of the present invention, the preferred embodiment of the method can be set forth.

A method of constructing powered pallet assembly 10 is provided which is comprised of the steps of selecting or providing a powered pallet having a frame, preferably with an upwardly facing load-supporting platform or surface 12 for receipt of objects or workpieces thereon. A first set of load-supporting wheels 16a, 16b are rotatably mounted to frame 23 of the pallet, preferably by axles 20a and 20b. A second set of load-supporting wheels 18a, 18b are rotatably mounted to frame 23, preferably by axles 22a and 22b, at an angle to the first wheels corresponding to the angle between intersecting trackways on which the pallet is to be used. The pallet assembly 10 also has a power drive assembly, comprising a motor controller, a motor 30, shaft 32, gear box 34, output shafts 36 and 38 and belts 37 and 39, and pulleys 31 and 35 coupled to drive at least one wheel of the first set of wheels 16a, 16b and at least one wheel of the second set of wheels 18a, 18b.

In order to permit driving along either of the intersecting trackways, the present pallet assembling method accomplishes the mounting steps by mounting each set of wheels 16a, 16b and 18a, 18b in a manner that one of the sets of wheels is disengaged from the trackway 11, 13 on which the other set of wheels rollingly supports the pallet. This most preferably is accomplished by laterally and/or vertically offsetting each set of wheels from the point or plane of contact of the other set of wheels with the supporting trackway.

The pallet system of the present invention also is constructed with intersecting trackways having movable track sections 60 and 62 which provide switching structures such that the pallet assembly is able to move in either of intersecting planes or directions D1 or D2.

A method of operating the present invention includes the steps of propelling pallet assembly 10 along a first trackway 11 of two trackways 11 and 13, which intersect at an angle to each other, using at least one wheel of a first set of wheels 16a, 16b, while a second set of wheels 18a, 18b, is disengaged from first trackway 11. Additionally, pallet assembly 10 is propelled along second trackway 13 by at least one wheel of second wheels 18a, 18b, while first wheels 16a, 16b are disengaged from second trackway 13. Trackways 11 and 13 preferably intersect at 90°.

A method also is provided for automatically preventing a first moving pallet assembly 10' from hitting a second slowly moving or stationary pallet 10, including the steps of sensing the presence of stationary pallet 10 and automatically stopping the pallet.

Finally, a method of controlling the movement of a powered pallet assembly on a trackway is provided which includes the step of controlling operation of a motor carried by the pallet using motion control members mounted proximate the trackway. At least one movable motion control member is selectively moved and sensors carried by the pallet sense are positioned on the motion control member and in response thereto control operation of the pallet motor. Using motion control members, centering or indexing of pallet assembly 10 directly over a trackway intersection 17 and the switching assembly can be accomplished. The method includes the steps of sensing the presence of reflective intersection marking strips 65, and slowing and stopping the pallet assembly at the strips. Preferably, the method also includes the step of crawling the pallet forward to a stop position. Using the method and trackway switching, it is possible to control the movement of the pallet assembly in any one of four directions D1A, D2A, D1B, and D2B at an intersection 17.

What is claimed is:

1. A powered pallet assembly comprising:
   a) a pallet frame formed for support of a load thereon;
   b) a plurality of load-supporting first wheels mounted to said frame for rolling support of said frame for movement in a first direction along a first trackway;
   c) a plurality of load-supporting second wheels mounted to said frame at an angle to said first wheels for rolling support of said frame for movement in a second direction along a second trackway oriented to intersect said first trackway substantially at said angle;
   d) a power drive assembly carried by said frame and coupled to drive at least one of said first wheels and coupled to drive at least one of said second wheels; and
   e) said first wheels and said second wheels, being mounted to said frame in a manner adapted for movement of said pallet assembly:
      i) along said first trackway in said first direction with said second wheels disengaged from said first trackway, and
      ii) along said second trackway in said second direction with said first wheels disengaged from said second trackway.

2. The powered pallet assembly as defined in claim 1 wherein,
   said first wheels and said second wheels are mounted to said frame at fixed locations.

3. The powered pallet assembly as defined in claim 2 wherein,
   said first wheels are mounted to rotate in side-by-side parallel first planes extending in said first direction, and
   said second wheels are mounted to rotate in side-by-side parallel second planes extending in said second direction.

4. The powered pallet assembly as defined in claim 3 wherein,
   said first planes and said second planes are substantially perpendicular to each other.

5. The powered pallet assembly as defined in claim 2 wherein,
   said first wheels are mounted to said frame in at least one of a laterally offset and a vertically offset position relative to a point of engagement of said second wheels with said second trackway, and
   said second wheels are mounted to said frame in at least one of a laterally offset and a vertically offset position relative to a point of engagement of said first wheels with said first trackway.

6. The powered pallet assembly as defined in claim 5 wherein,
   said first wheels are mounted to said frame in a laterally offset position relative to a point of engagement of said second wheels with said second trackway; and
   said second wheels are mounted to said frame in a laterally offset position relative to a point of engagement of said first wheels with said first trackway.

7. The powered pallet assembly as defined in claim 5 wherein, said first wheels are mounted to said frame in a vertically downwardly offset position relative to a point of engagement of said second wheels with said second trackway; and said second wheels are mounted to said frame in a laterally offset position relative to a point of engagement of said first wheels with the said first trackway.

8. The powered pallet assembly as defined in claim 2 wherein, said plurality of load-supporting first wheels are provided by two longitudinally spaced apart pairs of laterally spaced apart wheels; and said plurality of load-supporting second wheels are provided by two laterally spaced apart pairs of longitudinally spaced apart wheels.

9. The powered pallet assembly as defined in claim 8 wherein, said power drive assembly is coupled to drive one of said pairs of first wheels and is coupled to drive one of said pairs of second wheels.

10. The powered pallet assembly as defined in claim 9 wherein, said power drive assembly includes a single motor coupled through a drive train assembly to drive both said first wheels and said second wheels.

11. The powered pallet assembly as defined in claim 1 wherein, at least one of said first wheels and said second wheels are mounted to said frame for movement to a position disengaging said at least one of said first wheels and said second wheels from the trackways.

12. The powered pallet assembly as defined in claim 1 wherein, said power drive assembly is formed to simultaneously drive both one of said first wheels and one of said second wheels.

13. The powered pallet assembly as defined in claim 1 wherein, said frame is generally rectangular in shape, and a plurality of laterally guide elements mounted to said frame in positions for engagement with a guideway structure proximate the trackways for lateral guiding of said frame on the trackways.

14. The powered pallet assembly as defined in claim 13 wherein, said guide elements are provided by rollers rotatably mounted to said frame.

15. The powered pallet assembly as defined in claim 1, and a sensor mounted to said frame and oriented to sense the presence of a second pallet in a direction of movement of said pallet assembly, said sensor being coupled to said drive assembly to communicate a signal stopping operation of said drive assembly upon sensing of a second pallet.

16. The powered pallet assembly as defined in claim 15 wherein, said frame has four sensors mounted to sense the presence of a second pallet on any one of four sides of said pallet assembly, each of said sensors being coupled to said drive assembly to communicate signals thereto for stopping operation of said drive assembly.

17. The powered pallet assembly as defined in claim 1, and a sensor mounted to said frame and oriented to sense the presence of position-indicating flags positioned along a trackway, s aid sensor being coupled to said drive assembly to communicate signals to said drive assembly effecting operation of said drive assembly.

18. The powered pallet assembly as defined in claim 17 wherein, said frame has a plurality of sensors oriented to sense the presence of position-indicating flags positioned along a trackway and each of said sensors are coupled to effect operation of said drive assembly.

19. The powered pallet assembly as defined in claim 1 wherein, said power drive assembly includes an electric motor and a battery electrically coupled to said motor.

20. The powered pallet assembly as defined in claim 19 wherein, said drive assembly includes a programmed controller device coupled to control operation of said motor.

21. A trackway-based powered pallet system comprising:
a) a first trackway;
b) a second trackway intersecting said first trackway at an angle at an intersection;
c) at least one powered pallet assembly supported for rolling movement on one of said first trackway and said second trackway, said powered pallet assembly including:
i) a frame formed for support of a load,
ii) a plurality of load-supporting first wheels rotatably mounted to said frame for rolling support of said frame on said first trackway;
iii) a plurality of load-supporting second wheels rotatably mounted to said frame at an angle to said first wheels for rolling support of said frame on said second trackway,
iv) a power drive assembly carried by said frame and coupled to drive at least one of said first wheels and coupled to drive at least one of said second wheels,
v) said first wheels being further mounted to said frame in a position causing said first wheels to be disengaged from said second trackway when said pallet assembly is supported for movement on said second trackway by said second wheels, and
vi) said second wheels being further mounted to said frame in a position causing said second wheels to be disengaged with said first trackway when said pallet assembly is supported for movement on said first trackway by said first wheels.

22. The powered pallet system as defined in claim 21 wherein, said first trackway and said second trackway are oriented to extend in substantially perpendicular directions.

23. The powered pallet system as defined in claim 22 wherein, said system includes a plurality of first trackways extending in side-by-side generally parallel relation, said system includes a plurality of second trackways extending in side-by-side generally parallel relation and oriented substantially perpendicular to and intersecting with said first trackways at a plurality of intersections to form a trackway grid.

24. The powered pallet system as defined in claim 23 wherein, said system includes a plurality of pallet assemblies each formed as defined for the first-named pallet assembly.

25. The powered pallet system as defined in claim 21, and
a plurality of guideway structures mounted proximate said first trackway and said second trackway and formed to cooperatively engage said pallet assembly for guiding of the lateral position of said pallet assembly while moving on said first trackway and said second trackway.

26. The powered pallet system as defined in claim 25 wherein,
said pallet assembly carries roller guides positioned to rollingly engage said guideway structures for lateral guiding of said pallet assembly on said first trackway and said second trackway.

27. The powered pallet system as defined in claim 21 wherein,
said first trackway includes a plurality of track sections proximate said intersection mounted for selective movement between a position supporting said first wheels thereon and a position disengaged from said first wheels to permit rolling support of said pallet assembly by said second wheels on said second trackway through said intersection and to permit switching of the direction of movement of said pallet assembly from said first trackway to said second trackway.

28. The powered pallet system as defined in claim 27 wherein,
said second trackway includes a plurality of track sections proximate said intersection mounted for selective movement between a position supporting said second wheels thereon and a position disengaged from said second wheels to permit rolling support of said pallet assembly by said first wheels on sa id first trackway through said intersection and to permit switching of the direction of movement of said pallet assembly from said second trackway to said first trackway.

29. The powered pallet system as defined in claim 28 wherein,
said movable track sections are all mounted by track displacement assemblies for downward displacement from the positions supporting said first wheels and said second wheels to the positions disengaging said first wheels and said second wheels.

30. The powered pallet system as defined in claim 29 wherein,
said track displacement assemblies each includes a cam and a cam follower, said track sections being carried by said cam follower.

31. The powered pallet system as defined in claim 30 wherein,
a plurality of cams are coupled to an actuator and drive linkage formed for substantially simultaneous displacement of each of said track sections in said first trackway, and
a plurality of cams are coupled to an actuator and drive linkage formed for substantially simultaneous displacement of each of said track sections in said second trackway.

32. The powered pallet system as defined in claim 31 wherein,
said cams for displacement of said track sections in said first trackway and said cams for displacement of said track sections in said second trackway are coupled to the same actuator.

33. The powered pallet system as defined in claim 32 wherein,
said drive linkages and said cams are formed to lower said track sections in said first trackway and raise said track sections in said second trackway and to lower said track sections in said second trackway and raise said track sections in said first trackway.

34. The powered pallet system as defined in claim 21 wherein,
said second trackway includes a plurality of track sections proximate said intersection mounted for selective movement between a position supporting said second wheels thereon and a position disengaged from said second wheels to permit rolling support of said pallet assembly by said first wheels on said first trackway through said intersection and to permit switching of the direction of movement of said pallet assembly from said second trackway to said first trackway.

35. The powered pallet system as defined in claim 21 wherein,
said first trackway and said second trackway are each provided by a pair of side-by-side parallel rails.

36. The powered pallet system as defined in claim 35 wherein,
said rails in said first trackway are laterally spaced apart by a distance which differs from the lateral distance between said rails in said second trackway.

37. The powered pallet system as defined in claim 35 wherein,
said pallet assembly is rollingly supported on top of said rails, and
said frame carries a generally rectangular load-supporting platform thereon.

38. The powered pallet system as defined in claim 21 wherein,
said power drive assembly is coupled to simultaneously drive both said one of said first wheels and said one of said second wheels.

39. The powered pallet system as defined in claim 21 wherein,
said first wheels and said second wheels are mounted to said frame at fixed locations.

40. The powered pallet system as defined in claim 39 wherein,
said first wheels are mounted to rotate in side-by-side parallel first planes extending along said first trackway, and
said second wheels are mounted to rotate in side-by-side parallel second planes extending along said second trackway.

41. The power pallet system as defined in claim 40 wherein,
said first planes and said second planes are substantially perpendicular to each other.

42. The powered pallet system as defined in claim 39 wherein,
said first wheels are mounted to said frame in at least one of a laterally displaced and a vertically displaced position relative to a point of rolling engagement of said second wheels with said second trackway, and
said second wheels are mounted to said frame in at least one of a laterally displaced and a vertically displaced position relative to a point of rolling engagement of said first wheels with said first trackway.

43. The powered pallet system as defined in claim 42 wherein,
said first wheels are mounted to said frame in a laterally displaced position relative to a point of rolling engagement of said second wheels with said second trackway, and
said second wheels are mounted to said frame in a laterally displaced position relative to a point of rolling engagement of said first wheels with said first trackway.

44. The powered pallet system as defined in claim 42 wherein, said first wheels are mounted to said frame in a vertically downwardly displaced position relative to a point of rolling engagement of said second wheels with said second trackway, and said second wheels are mounted to said frame in a laterally displaced position relative to a point of rolling engagement of said first wheels with said first trackway.

45. The powered pallet system as defined in claim 21 wherein, at least one of said first wheels and said second wheels are mounted to said frame for movement to a position disengaging said at least one of said first wheels and said second wheels from the trackways.

46. The powered pallet system as defined in claim 21 wherein, said pallet assembly includes a proximity sensor oriented to sense proximity of said pallet assembly to another pallet assembly and coupled to effect operation of said drive assembly upon sensing of another pallet assembly.

47. The powered pallet system as defined in claim 46 wherein, each of four sides of said frame have a proximity sensor mounted thereto and oriented to sense another pallet assembly proximate said sides, each said proximity sensor being coupled to terminate operation of said drive assembly.

48. The powered pallet system as defined in claim 47 wherein, each said sensor is mounted to said sides in a laterally offset relation to central planes through said frame.

49. The powered pallet system as defined in claim 48, and a reflective area provided on said frame offset from said central planes by an amount aligning said reflective area on said pallet assembly with an offset sensor on another pallet assembly.

50. The powered pallet system as defined in claim 21, and a position sensor carried by said frame and oriented to sense position flags located along one of said trackways, said position sensor being coupled to effect operation of said drive assembly in response to sensing of a position flag; and at least one position flag positioned along at least one of said trackways at a predetermined location.

51. The powered pallet system is defined in claim 50 wherein, said position flag is positioned proximate an intersection between said first trackway and said second trackway.

52. The powered pallet system as defined in claim 51 wherein, said position flag is movably mounted proximate said trackway and is coupled for control of movement thereof to a central controller.

53. The powered pallet system as defined in claim 50, and a motor direction flag mounted proximate one of said trackways, and a motor direction sensor carried by said frame and coupled to control the direction of operation of said drive assembly.

54. The powered pallet system as defined in claim 53 wherein, said motor direction flag is movably mounted proximate said trackway and is coupled for control of movement thereof to a central controller.

55. The powered pallet system as defined in claim 54, and a track section movably mounted in said one of said trackways proximate said motor direction flag and coupled to said central controller.

56. The powered pallet system as defined in claim 55, and a position sensor flag mounted proximate said motor direction flag, said pallet frame including a position sensor.

57. A method of operation of a trackway-based powered pallet system comprising the steps of:

propelling a powered pallet assembly along a first trackway using at least one wheel of a first set of load-supporting wheels provided on said pallet assembly while a second set of load-supporting wheels provided on said pallet assembly is disengaged from said first trackway; and propelling said pallet assembly along a second trackway oriented to and intersecting said first trackway using at least one wheel of said second set of load-supporting wheels while said first set of load-supporting wheels is disengaged from said second trackway.

58. The method as defined in claim 57, and the step of:

at an intersection between said first trackway and said second trackway switching said pallet assembly for propelling along a selected one of said first trackway and said second trackway by displacing a section of the trackways to disengage one of said first set and said second set of load-supporting wheels and engage the other of said first set and said second set of load-supporting wheels from said selected one of said first trackway and said second trackway.

59. The method as defined in claim 58 wherein, said switching step is accomplished by displacing a plurality of track sections located proximate said intersection.

60. The method as defined in claim 59 wherein, said displacing step is accomplished by raising track sections of one of said first trackway and said second trackway and lowering track sections of the other of said first trackway and said second trackway.

61. The method as defined in claim 60 wherein, said raising step and said lowering step occur substantially simultaneously.

62. The method as defined in claim 57 wherein, said propelling steps are accomplished while simultaneously driving said one wheel of said first set of load-supporting wheels and said one wheel of said second set of load-supporting wheels.

63. A method of constructing a powered pallet assembly comprising the steps of:

a) providing a pallet frame having a load-supporting surface thereon;

b) rotatably mounting a first set of load-supporting wheels to said frame;

c) rotatably mounting a second set of load-supporting wheels to said frame;

d) securing a power drive assembly to said frame and coupling said power drive assembly to drive at least one wheel of said first set of load-supporting wheels and to at least one wheel of said second set of load-supporting wheels; and e) during said mounting steps, mounting said first set of load-supporting wheels to said frame in a position to be disengaged from a second trackway when said frame is rollingly supported on said second trackway by said second set of load-supporting wheels, and during said mounting steps, mounting said second set of load-supporting wheels to said frame in a position to be disengaged from a first trackway intersecting said second trackway when said frame is rollingly supported on said first trackway by said first set of load-supporting wheels.

64. A method of centering a powered pallet assembly directly over a trackway intersection comprising the steps of:

a) sensing a position indicator proximate said intersection using a sensor carried by said powered pallet assembly; and b) slowly advancing said powered pallet assembly until said pallet assembly engages a stop at said intersection and said power pallet assembly in a centered position over said intersection.

65. The method as defined in claim 64 and thereafter the step of:

switching a section of said trackway to enable movement of said powered pallet assembly along a new direction of travel from a direction of travel in which said powered pallet assembly entered said intersection.

66. A method of controlling the movement of a powered pallet assembly on a trackway, said trackway including at least one intersection of a first trackway and a second trackway and a movable switch assembly at said intersection formed for switching of movement of said pallet assembly between said first trackway and said second trackway, said movable switch assembly being coupled to a controller for control of movement thereof, and said trackway further including at least one movable control member positioned proximate said intersection, said method comprising the steps of:

controlling operation of a motor carried by said pallet assembly using said movable control member by:

selectively moving the position of said movable control member from a remote location using a controller coupled to communicate control signals to said movable control member;

selectively moving said switch assembly using said controller to a desired switch position; and sensing a position of said movable control member by a sensor carried by said pallet assembly and controlling operation of said motor in response to the position of the control member which is sensed to stop said motor while said pallet assembly is on said first trackway and to start said motor after said step of moving said switch assembly to cause said pallet to move along said second trackway.

67. The method of controlling the movement of a powered pallet assembly as defined in claim 66 wherein, said motor carried by said pallet assembly is a reversible motor; and said controlling operation of said motor step includes the step of operating said motor in a selected one of two opposed directions in response to the position sensed during said sensing step.

68. The method of controlling the movement of a powered pallet assembly as defined in claim 67 wherein, said pallet assembly includes a first set of load-supporting wheels rollingly supported on said first trackway and a second set of load-supporting wheels disengaged from said first trackway, said second set of load-supporting wheels being oriented at an angle to said first set of load-supporting wheels and being formed for rolling support on said second trackway, and said first set of load-supporting wheels further being mounted to be disengaged from said second trackway when said pallet assembly is rollingly supported on said second trackway; and the step of:

during said step of controlling operation of said motor, simultaneously driving said first set of load-supporting wheels and said second set of load-supporting wheels in said selected one of two opposed directions.

69. The method of controlling the movement of a powered pallet assembly as defined in claim 60 wherein, said motion control members include at least one stationary control member; and said sensing step further includes the step of sensing the presence of said stationary control member mounted proximate said trackway and controlling operation of said motor in response thereto.

70. The method of controlling the movement of a powered pallet assembly as defined in claim 66, and the step of:

sensing the proximity of a second pallet assembly on said trackway, and slowing motor operation in response to said step of sensing the proximity of a second pallet assembly.

\* \* \* \* \*